(12) United States Patent
Ishihara et al.

(10) Patent No.: US 10,057,834 B2
(45) Date of Patent: Aug. 21, 2018

(54) RELAY DEVICE AND COMMUNICATION SYSTEM

(71) Applicant: KABUSHIKI KAISHA TOSHIBA, Tokyo (JP)

(72) Inventors: Takeshi Ishihara, Kanagawa (JP); Yuichiro Oyama, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 195 days.

(21) Appl. No.: 14/847,328

(22) Filed: Sep. 8, 2015

(65) Prior Publication Data

US 2016/0081003 A1   Mar. 17, 2016

(30) Foreign Application Priority Data

Sep. 16, 2014 (JP) ................................. 2014-188189

(51) Int. Cl.
*H04W 40/04* (2009.01)
*H04B 7/155* (2006.01)

(52) U.S. Cl.
CPC ........ *H04W 40/04* (2013.01); *H04B 7/15507* (2013.01)

(58) Field of Classification Search
None
See application file for complete search history.

(56) References Cited

U.S. PATENT DOCUMENTS

| 6,874,017 | B1 | 3/2005 | Inoue et al. |
| 7,277,942 | B2 | 10/2007 | Inoue et al. |
| 7,814,483 | B2 | 10/2010 | Li et al. |
| 2005/0132049 | A1* | 6/2005 | Inoue .................. G06F 17/3087 709/225 |
| 2010/0057924 | A1 | 3/2010 | Rauber et al. |

FOREIGN PATENT DOCUMENTS

| JP | 2000-276425 | 10/2000 |
| JP | 2007-521541 | 8/2007 |
| WO | 2005-048011 | 5/2005 |

OTHER PUBLICATIONS

Jacobson, V. et al., "Networking Named Content," CoNEXT 2009, Rome, Dec. 2009, pp. 1-12.
Ishihara et al., U.S. Appl. No. 14/853,174, filed Sep. 14, 2015.

* cited by examiner

*Primary Examiner* — Jung Liu
(74) *Attorney, Agent, or Firm* — Nixon & Vanderhye, P.C.

(57) ABSTRACT

A relay device relays a signal between a first network and a second network. The relay device includes a first circuitry to wirelessly communicate with a wireless terminal over the first network and communicate with a first relay device over the second network. The relay device includes a second circuitry to detect a communication request transmitted by the wireless terminal. The relay device includes a third circuitry to decide whether relay of object information corresponding to the communication request is able to be completed with the wireless terminal while the wireless terminal stays within a wireless communication range of the relay device, and causes the first circuitry to transmit a request signal to request to relay a part or a whole of the object information to the first relay device instead of said relay device when a result of decision indicates that the relay is not able to be completed.

15 Claims, 28 Drawing Sheets

_US 10,057,834 B2_

RELAY DEVICE AND COMMUNICATION SYSTEM

CROSS-REFERENCE TO RELATED APPLICATIONS

This application is based upon and claims the benefit of priority from Japanese Patent Application No. 2014-188189, filed Sep. 16, 2014; the entire contents of which are incorporated herein by reference.

FIELD

Embodiments described herein relate to a relay device and a communication system.

BACKGROUND

Wireless communications represented by IEEE 802.11 have been in widespread use. In these communications systems, in order to connect communications via wireless to a backend network constructed by wired communication technologies, relay devices called access points, base stations, or the like are used. The access points function as bridges that connect different networks in the data link layer, the role of which is to relay frames between a wireless side and a wired side, or to relay frames between different wireless communicating schemes. At this point, the access point does not save the frames for a long time, and the received frames are immediately transferred to a network being a relay destination.

In contrast, there has been proposed a communications system that has a caching function of temporarily save data relayed by routers and bridges on a network, so as to treat chunks of semantic information as the core of transmission (Content-Centric Networking: CCN). In this scheme, when a user intends to acquire desired information, the nearest cache is selected from among a plurality of caches existing in a network, and a terminal having a communicating function receives the information transmitted from the nearest cache.

Furthermore, in wireless communication, it is assumed that a wireless terminal having a wireless communicating function moves. For that reason, if object information to be downloaded or uploaded has a large size, the download or upload of object data may not be finished during connection with one access point. In that case, it is necessary for a wireless terminal to successively connect to a plurality of access points to download or upload the data. However, in some cases, a cache may not function effectively, and it takes a long time to download or upload the object information.

DETAILED DESCRIPTION

Figure 1:
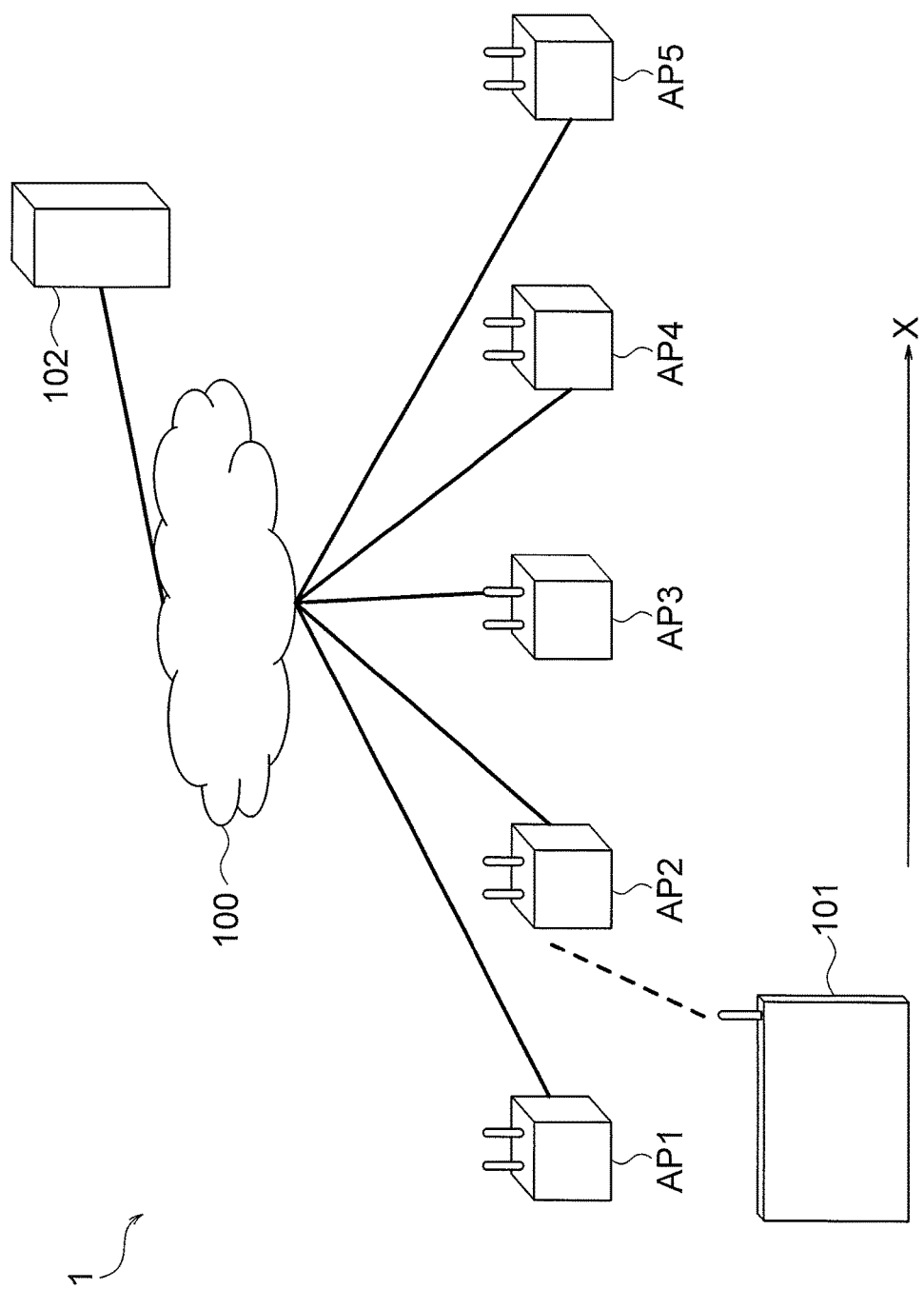
FIG. 1 is a diagram showing the configuration of a communication system 1 in a first embodiment.

According to one embodiment, a relay device relays a signal between a first network and a second network.

The relay device includes a first circuitry to wirelessly communicate with a wireless terminal over the first network and communicate with a first relay device over the second network.

The relay device includes a second circuitry to detect a communication request transmitted by the wireless terminal.

The relay device includes a third circuitry to decide whether or not relay of object information corresponding to the communication request is able to be completed with the wireless terminal while the wireless terminal stays within a wireless communication range of the relay device. The third circuitry causes the first circuitry to transmit a request signal to request to relay a part or a whole of the object information to the first relay device instead of the relay device when a result of decision indicates that the relay is not able to be completed.

Below, embodiments will be described below with reference to the drawings. The embodiments to be described below are merely examples and not necessarily the same. In addition, the same components in the drawings will be denoted by the same reference numerals, and will not be described as appropriate.

First Embodiment

First, a first embodiment will be described. FIG. 1 is a diagram showing the configuration of a communication system 1 in the first embodiment. As shown in FIG. 1, the communication system 1 includes a wireless terminal 101, access points (relay devices) AP1, . . . , AP5, and a server (information processing device) 102 that is connected to the access points AP1, . . . , AP5 over a network 100.

The wireless terminal 101 moves while switching access points AP-i one by one, where i is an integer from one to five, and is connected to the network 100 via the connected access point AP-i. The selection of the access point AP-i to be connected is properly performed based on wireless communication ranges of the access points AP1 to AP5.

The access points AP1 to AP5 relay signals between a first network and a second network. Here, in the present embodiment, as an example, the first network is a wireless network formed by an access point AP-i, and the second network is a wired network of the network 100. Hereafter, the access points AP1 to AP5 are collectively referred to as an access point AP.

Note that, FIG. 1 shows the access points AP1 to AP5 as if they are arranged in the same line, but they are actually disposed under geographic conditions. In addition, each access point AP-i in the present embodiment has the same configuration.

Figure 2:
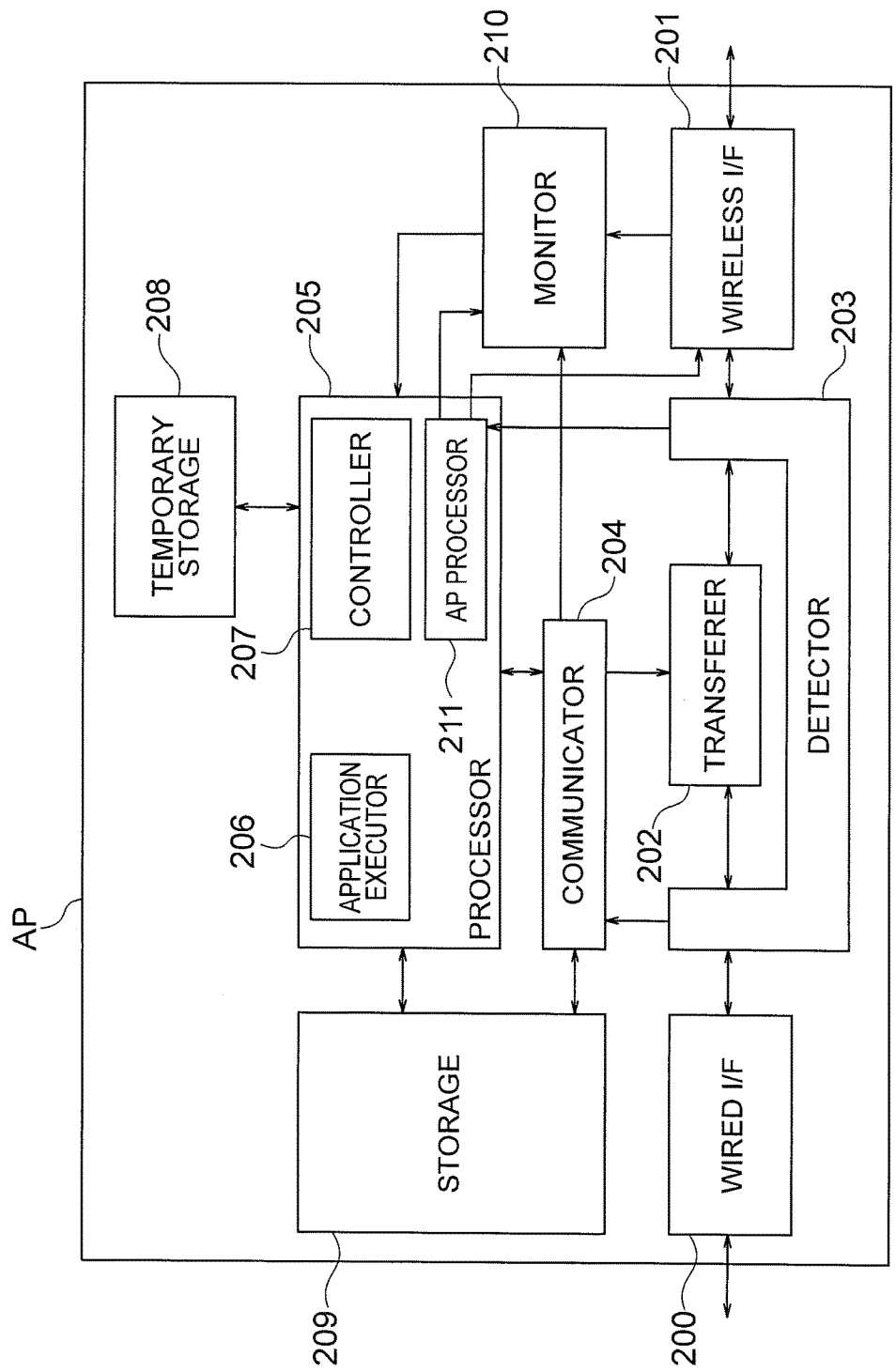
FIG. 2 is a diagram showing the configuration of an access point AP in the first embodiment.

Next, the configuration of the access point AP in the first embodiment will be described. FIG. 2 is a diagram showing the configuration of the access point AP in the first embodiment. As shown in FIG. 2, the access point AP includes a wired I/F 200, a wireless I/F 201, a transferor 202, a detector 203, a communicator 204, a processor 205, a temporary storage 208, a storage 209, and a monitor 210.

The wired I/F 200, a wireless I/F 201, a transferor 202, a detector 203, a communicator 204, a processor 205, and a monitor 210 can be implemented by circuitry such as a processor or an integrated circuit. Each circuitry which implements the wired I/F 200, a wireless I/F 201, a transferor 202, a detector 203, a communicator 204, a processor 205, and a monitor 210 may be different physical circuitry, or all or a part of them may be same physical circuitry.

The wired I/F 200 is an interface used to connect with the network 100 in a wired manner.

The wireless I/F 201 is an interface used to provide a wireless network.

The wired I/F 200 and the wireless I/F 201 may perform processing of the physical layer or may perform processing up to the data link layer. In the present embodiment, as an example, the description will be made below assuming that they perform the processing up to the data link layer.

Note that, if the wired I/F 200 and the wireless I/F 201 perform only the processing of the physical layer, the transferor 202 or the communicator 204 may perform the processing of the data link layer.

The wired I/F 200 and the wireless I/F 201 are connected to each other via the transferor 202.

The transferor 202 transfers data, which is rather frames in the present embodiment because the processing is in the data link layer as an example, received from the wired I/F 200 or the wireless I/F 201 to an appropriate interface. Here, the appropriate interface is one of the wired I/F 200 and the wireless I/F 201. This processing is performed based on a destination address (destination MAC address) in the data link layer. Note that the interface used to transfer may be determined based on the transmitting source address. The wired I/F 200 and the transferor 202 are connected to each other via the detector 203, and the wireless I/F 201 and the transferor 202 are connected to each other via the detector 203.

The detector 203 checks data (e.g., an Ethernet frame) received at the wired I/F 200 or the wireless I/F 201, checks whether or not the data is a frame that matches a preset condition, and outputs this data to the communicator 204 if the data matches the condition. Here, the condition is, for example, whether the data is a packet having an identifier used by the communicator 204 as a destination address (e.g., IP address), or whether the data is of communication that exchanges information that may be saved by the temporary storage 208 (e.g., whether a destination TCP (Transmission Control Protocol) port number is 80). In such a manner, the detector 203 detects a communication request transmitted by the wireless terminal 101. Here, the communication request may be either a downloading request or an uploading request, but in the present embodiment, as an example, the description will be made below assuming that the communication request is a downloading request.

The communicator 204 performs wireless communication with the wireless terminal 101 over the first network (e.g., wireless network), and performs communication with the other access point (relay device) over the second network (e.g., network 100). Note that the communicator 204 may perform communication with the other access point (relay device) over the first network (here, wireless network).

For example, the communicator 204 performs processing under the TCP/IP (Internet Protocol). That is, the communicator 204 performs establishment processing on a TCP connection, if necessary, for a packet detected by the detector 203, to enable communication with a specified application. Note that this is also applied to packets belong to the same TCP connection. Furthermore, when the communication is finished, the communicator 204 performs finish processing on the TCP connection to disconnect the TCP connection. Although the processing described here is performed under the TCP, the processing is performed also under the IP (Internet Protocol) or the UDP (User Datagram Protocol) as needed. Among the pieces of information that are subjected to the processing under the TCP/IP by the communicator 204, pieces of information determined to be processed by the access point AP is transferred to the processor 205.

The monitor 210 monitors the status of a communication channel and/or communication in the first network (e.g., wireless network) to acquire communication status information that represents the status of the communication channel and/or communication. More specifically, the monitor 210 monitors the operations of the wireless I/F 201 and the communicator 204 or the status of the communication to acquire information necessary for the operation of a controller 207. This acquired information is transferred to the processor 205.

The processor 205 includes an application executor 206, the controller 207, and an AP processor 211. In the present embodiment, these components will be described as individual components but may be software executed by the processor 205.

The application executor 206 is, for example, an OS (Operating System) that manages the operation of the access point AP and executes an application running on the access point AP.

The controller 207 controls the temporary storage 208.

In addition, the controller 207 decides whether or not relay of object information, with the wireless terminal 101, corresponding to the communication request detected by the detector 203 can be completed while the wireless terminal 101 exists within the wireless communication range of the access point in question. More specifically, the controller 207 performs this decision based on the communication status information acquired by the monitor 210.

Then, if the result of the decision indicates that the relay cannot be completed, the controller 207 causes the communicator 204 to transmit to the other access points (relay devices) a request signal to request the other access points to relay a part or the whole of the object information on behalf of itself. Here, in the present embodiment, this request signal is, as an example, a request signal to request to allocate a storage area to store the part or the whole of the object information. In addition, if the communication request is a downloading request, the controller 207, after the transmission of this request signal, causes the communicator 204 to transmit shared information on the part or the whole of the data to be transmitted to the other access point (relay device).

The AP processor 211 implements a function of providing wireless communication (e.g., management of a connected wireless terminal, transmission management of a beacon, user authentication).

The temporary storage 208 temporarily stores information exchanged via the access point AP. As a storage device used to implement this caching function, a volatile memory such as an SRAM (Static Random Access Memory) and a DRAM (Dynamic Random Access Memory), a nonvolatile memory such as a NAND flash and an MRAM (Magnetoresistive Random Access Memory), or an auxiliary storage device such as a SSD (Solid State Drive) and a hard disk can be used. The temporary storage 208 may be formed by only one of these means or may be formed by the combination of them. For example, by combining a NAND flash and a DRAM/MRAM, the temporary storage 208 with nonvolatility while the access speed is kept can be formed. Here, the following description will be made assuming that the temporary storage 208 is formed by one component.

The storage 209 causes information used by the communicator 204 and the processor 205 to be saved. The storage 209 is, for example, a RAM. If there is information (e.g., program or data) that need to be permanently saved, the storage 209 may be formed by a RAM and an auxiliary storage device (e.g., hard disk or SSD).

(Basic Operation of Download Processing as Transparent Proxy)

There will be described the basic operation of download processing by the access point AP, as a transparent proxy, having the above configuration.

The communication terminal 101 is connected to the access point AP over a wireless network provided by the wireless I/F 201. Here, it is assumed that association and authentication processing that is subsequently required have been completed, which brings a communication-enabled state. The following description will be made assuming that the wireless terminal 101 moves in an x-axis positive direction in FIG. 1.

Figure 3:
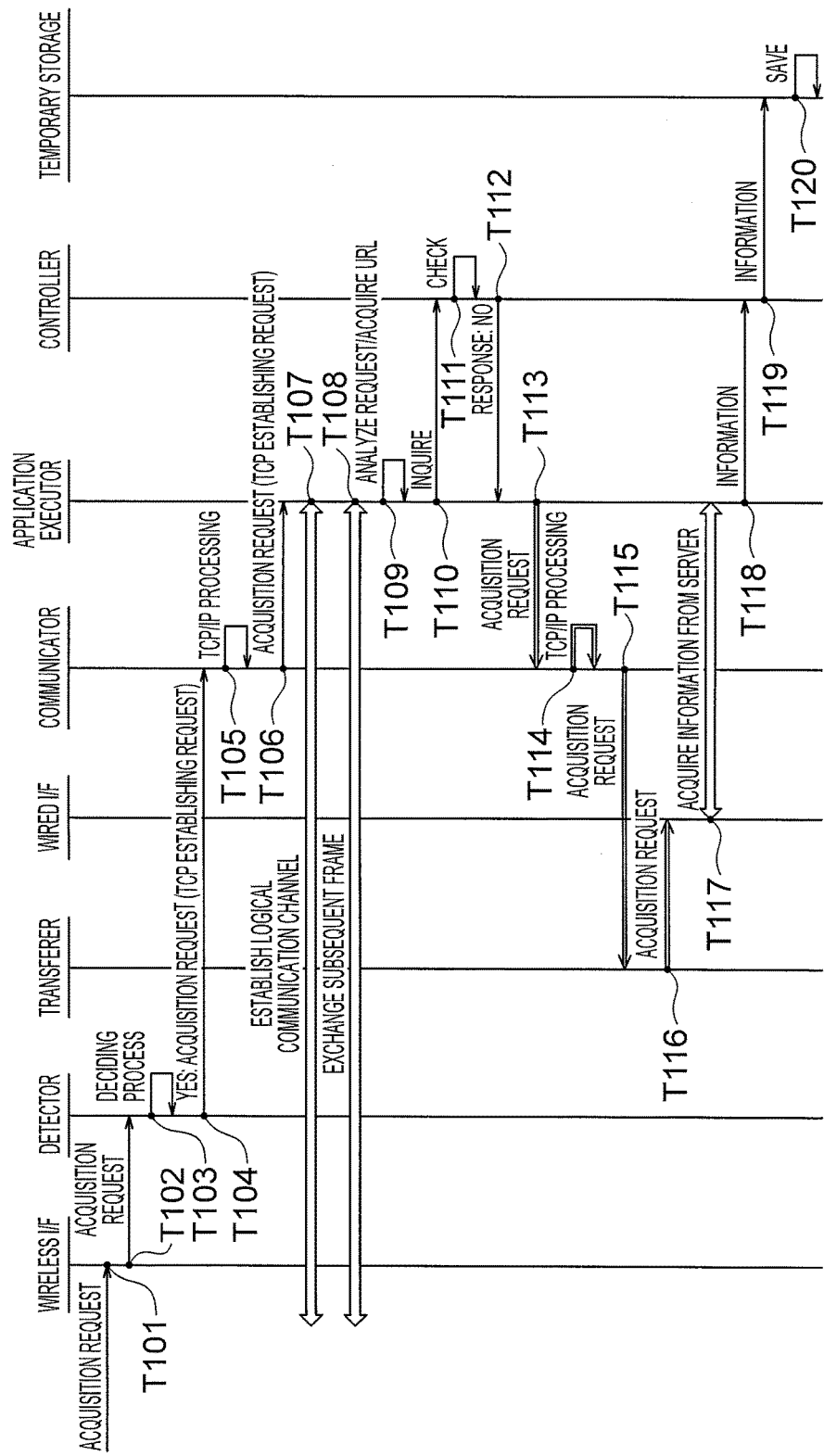
FIG. 3 is a sequence diagram showing an example of the flow of processing by the access point AP when information for which a wireless terminal 101 makes a downloading request is not saved in a temporary storage 208.

There will be described, with reference to FIG. 3, the operation of the access point AP in the case where information for which the wireless terminal 101 makes a downloading request is not saved in the temporary storage 208. FIG. 3 is a sequence diagram showing an example of the flow of processing by the access point AP when information for which the wireless terminal 101 makes a downloading request is not saved in the temporary storage 208. First, the processing is started by the wireless terminal 101 requesting the server 102 acquired object information to be acquired.

(T101) The wireless I/F 201 receives an acquisition request for this object information.

(T102) Then, the wireless I/F 201 passes the received acquisition request to the detector 203.

(T103) The detector 203 determines whether or not this acquisition request is an object to be processed by the communicator 204. Here, since this acquisition request is an acquisition request for the object information (e.g., the destination port is the TCP port number 80), this acquisition request is determined to be the object to be processed by the communicator 204.

(T104) As a result, the received frame is passed to the communicator 204. If this acquisition request is determined by the detector 203 not to be processed by the communicator 204, this acquisition request is passed to the transferor 202 and thereafter transferred to a uplink via the wired I/F 200. Here, according to FIG. 2, this acquisition request is passed again through the detector 203, and on the second time, this acquisition request may pass through the detector 203 without the determination. Note that this processing is not limited only to a single frame, but may be performed on subsequent frames without the decision under the condition if the headers of the frames contain the same pieces of information. That is, if pieces of information contained in the headers of a subsequent frame, an Ethernet header, an IP header, and a TCP header, have the same values as those of the respective headers of a frame that has been once determined by the detector 203, the detector 203 may skip checking the condition and process the subsequent frame as with the past frame.

(T105) The communicator 204 performs processing under the TCP/IP on the passed frame.

(T106) Then, the communicator 204 passes the acquisition request to the application executor 206.

(T107) Here, in the application executor 206, an application that acquires information from the server 102 on behalf of the wireless terminal 101 is running. The first frame contains an IP packet to establish a TCP connection, and thus a logical communication channel (TCP connection) is established between the wireless terminal 101 and the application executor 206 together with subsequent frames.

(T108) Thereafter, the subsequent frames are exchanged.

(T109) Next, the application executor 206 analyzes the request received from the wireless terminal 101 to acquire an identifier to identify information to be acquired. This identifier is expressed, for example, in the form of a URL.

(T110) Next, the application executor 206 notifies the controller 207 of this URL to inquire whether or not the information in question is cached in the temporary storage 208.

(T111) Next, the controller 207 receiving the inquiry decides whether or not the information in question is cached in the temporary storage 208 in accordance with information managed by itself.

(T112) The controller 207 transmits a decision result to the application executor 206 as a response. FIG. 3 shows, as an example, the case where it is decided that the information in question is not cached.

(T113) If the response indicates that the information in question is not cached, the application executor 206 acquires the information in question from the server 102 on behalf of the wireless terminal 101. More specifically, the application executor 206 first generates an acquisition request for the information in question and passes the acquisition request to the communicator 204.

(T114 to T116) The communicator 204 formats this acquisition request into a TCP/IP packet, and the formatted acquisition request is transferred to the wired I/F 200 via the transferor 202.

(T117 and T118) Next, the wired I/F 200 acquires object information being the object of the acquisition request from the server 102 through HTTP communication or the like, and this object information is transferred to the controller 207 via the application executor 206.

(T119 and T120) When the controller 207 receives the information from the application executor 206, the controller 207 stores this information in the temporary storage 208. The information that the wireless terminal 101 has requested to be acquired is thereby cached in the temporary storage 208.

Note that the information cached is associated with a term of validity, information to identify the wireless terminal 101 that has requested the information, and information on the wireless network to which the wireless terminal 101 is connected, and is in a state of being able to be properly managed by the controller 207. Here, the information on the wireless network to which the wireless terminal 101 is connected to is available from the AP processor 211 or identified from the IP address or the like used by the wireless terminal 101. The acquired information is finally transmitted to the terminal 101 as a response via the communicator 204 and the wireless I/F 201.

Figure 4:
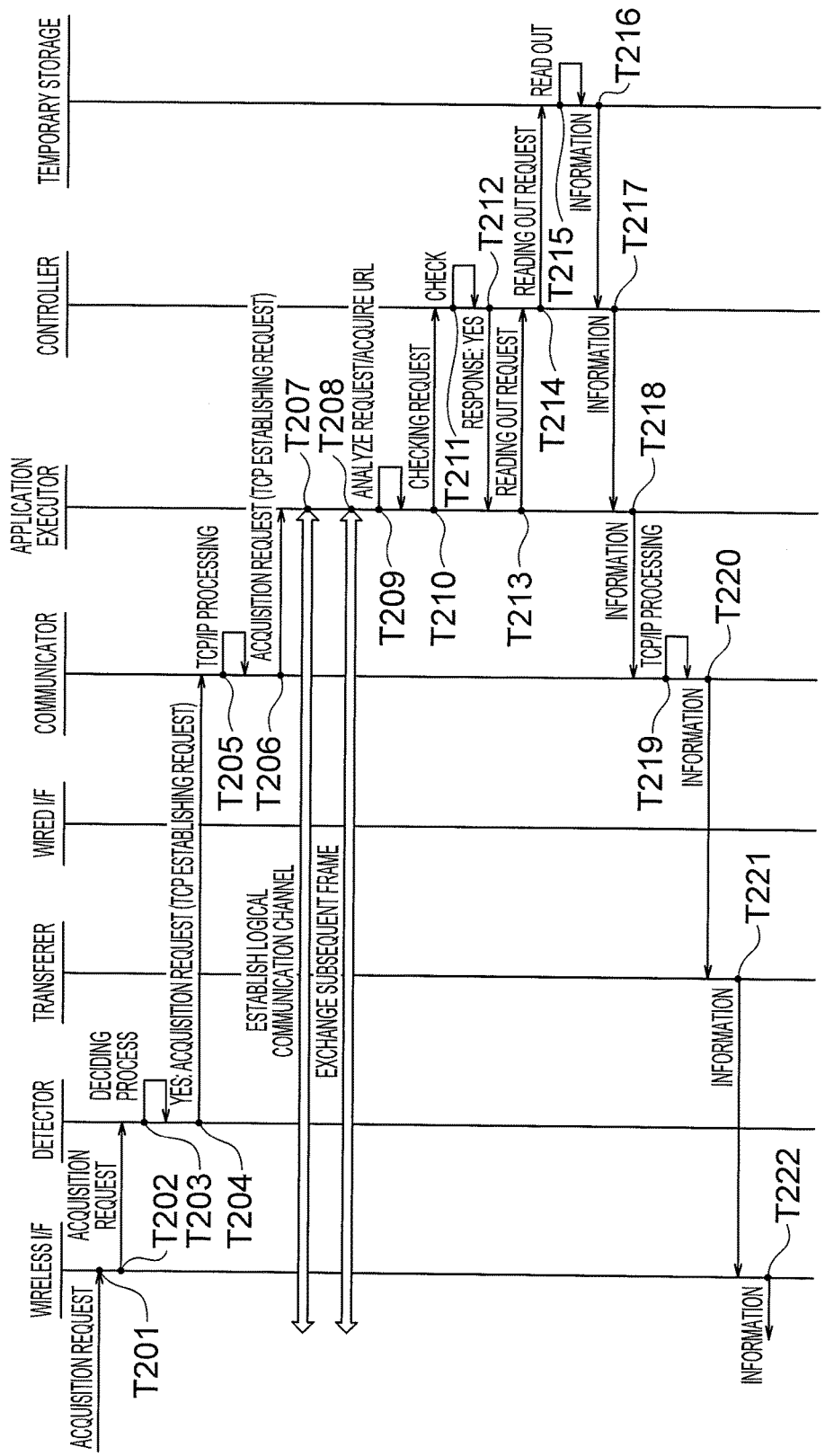
FIG. 4 is a sequence diagram showing an example of the flow of processing by the access point AP when the information for which the wireless terminal 101 makes the downloading request is saved in the temporary storage 208.

Next, there will be described, with reference to FIG. 4, the operation of the access point AP in the case where information for which the wireless terminal 101 makes a downloading request is saved in the temporary storage 208. FIG. 4 is a sequence diagram showing an example of the flow of processing by the access point AP when information for which the wireless terminal 101 makes a downloading request is saved in the temporary storage 208. The processing from T201 to T211 is the same as the processing from T101 to T111 and will not be described.

(T212) In FIG. 4, it is assumed that information requested from the wireless terminal 101 is cached in the temporary storage 208, and thus the controller 207 passes to the application executor 206 a response indicating that the information is cached.

(T213) The application executor 206 receiving the response indicating that the information is cached passes to the controller 207 a request to read out the information.

(T214) Then, the controller 207 reads out the information in question from the temporary storage 208 through the following procedure. The controller 207, for example, issues to the temporary storage 208 a request to read out the information in question.

(T215) The temporary storage 208 receiving the reading-out request reads out the information in question.

(T216) Then, the temporary storage 208 transmits the read-out information to the controller 207.

(T217 and T218) The controller 207 transmits the information in question to the wireless terminal 101 via the communicator 204 and the wireless I/F 201, through the following procedure. The information in question is transferred from the controller 207 to the application executor 206 and transferred from the application executor 206 to the communicator 204.

(T219 to T221) The communicator 204 formats the information in question into a TCP/IP packet, and the formatted information obtained through the formatting is transferred to the wireless I/F 201 via the transferor 202.

(T222) The wireless I/F 201 wirelessly transmits this formatted information to the wireless terminal 101 as a response.

(Operation of Download Processing Using Plural Access Points)

Next, there will be described the operation of download processing using a plurality of access points in the present embodiment. It is assumed that information requested by the wireless terminal 101 is cached in advance in the access point AP1. In addition, as described above, the wireless terminal 101 successively moves in the x-axis positive direction in FIG. 1. In addition, the wireless terminal 101 is in a state where it can normally perform association, authentication, and communication with each access point AP-i.

Figure 5:
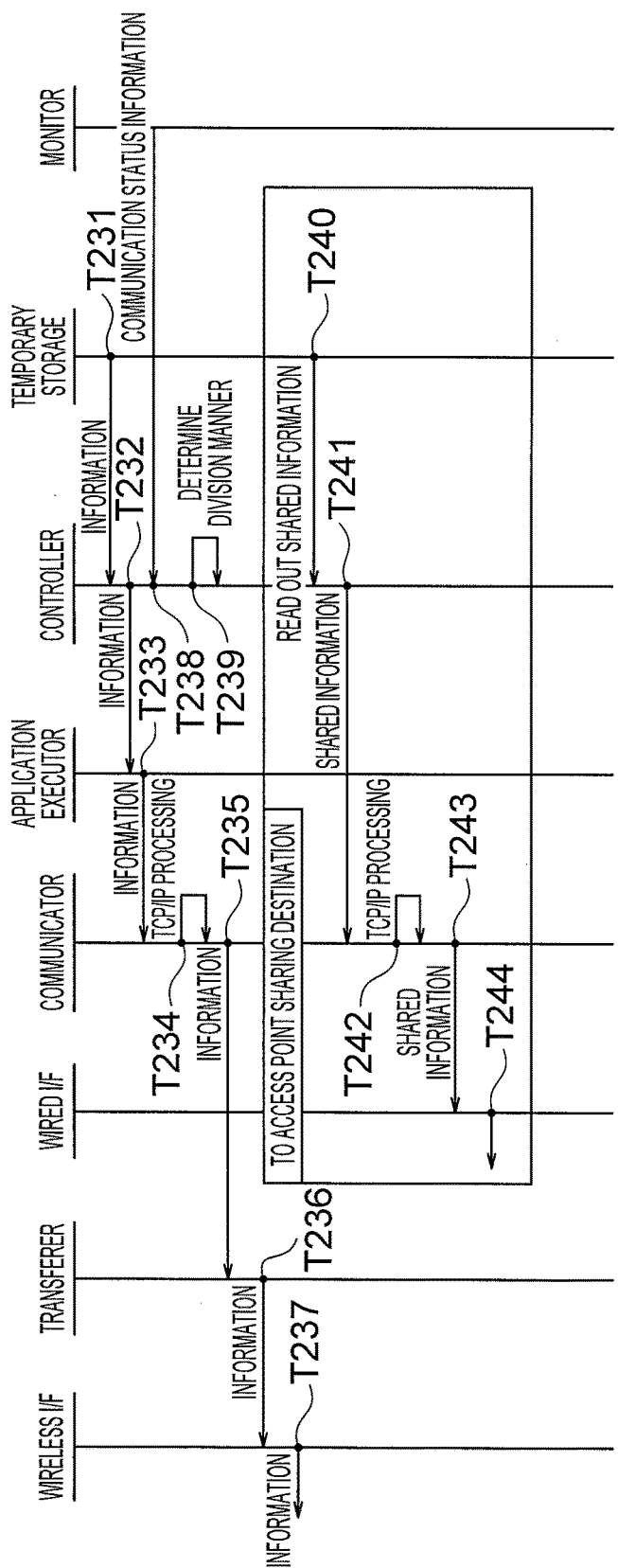
FIG. 5 is a sequence diagram showing an example of the flow of processing by an access point AP1.

FIG. 5 is a sequence diagram showing an example of the flow of processing by the access point AP1. FIG. 5 starts with processing in which the controller 207 of the access point AP1 transmits information requested by the wireless terminal 101 as a response. When the wireless terminal 101 transmits an acquisition request for information, as described above, it is confirmed whether the information in question acquired by the access point AP1 is cached in the temporary storage 208, and the information in question is transmitted to the wireless terminal 101.

More specifically, the controller 207 acquires the information in question from the temporary storage 208 (T231) and passes the information in question to the application executor 206 (T232). The application executor 206 passes the information in question to the communicator 204 (T233). The communicator 204 carries out the information in question to TCP/IP processing (T234) and passes to the transferor 202 the information obtained through the subjection (T235). The transferor 202 passes the information in question to the wireless I/F 201 (T236), and the wireless I/F 201 wirelessly transmits the information in question to the wireless terminal 101 (T237).

Concurrently with this response transmission processing, the controller 207 acquires communication status information that the monitor 210 obtained through monitoring (T238). Then, the controller 207 decides, using this communication status information, whether or not the transmission of object information to be transmitted to the wireless terminal 101 can be completed with the access point (relay device) in question. Here, assume the case where the result of the decision indicates that the transmission cannot be completed. In that case, the controller 207 determines, for each of the other access points AP-j, where j is an integer from two to five, shared information that the other access point AP-j is caused to cache (T239).

Then, concurrently with the above-described response transmission processing, or before or after the transmission, for each of the other access points AP-j, where j is an integer from two to five, the shared information allocated for the other access point is acquired from the temporary storage 208, and the acquired shared information is transmitted to the corresponding access point AP-j via the communicator 204.

More specifically, the access point AP1 repeats, for each access point, the share processing of information from reading out of the shared information in T240 to transmitting the shared information in T244. First, shared information to be transmitted to an object access point is read out (T240), and the shared information is transmitted to the communicator 204 (T241). Then, the communicator 204 packetizes the shared information through the TCP/IP processing (T242) and passes the packetized shared information to the wired I/F 200 via the transferor 202 (T243). Next, the wired I/F 200 outputs the packetized shared information to the object access point over the network 100 (T244).

In such a manner, in the case where a communication request is a downloading request, if object information requested using the communication request is saved in the temporary storage 208 that is an accessible storage device, the controller 207 causes the communicator 204 to transmit a part of the saved object information to the wireless terminal 101 and causes the communicator 204 to transmit to the other access points (relay devices) a request signal to request to allocate a storage area for storing a part or the whole of the object information.

In contrast, if the request data is not saved in the temporary storage 208, the object information is acquired from the server (information processing device) 102 connected over the second network, the communicator 204 is caused to transmit a part of the acquired object information to the wireless terminal 101, and the communicator 204 is caused to transmit a request signal to request to allocate a storage area for storing a part or the whole of the object information to the other relay devices.

In the above-described share processing of information, the whole of information to be an object (hereafter, referred to as object information) may be transmitted to the access points, but the whole of object information is not necessarily transmitted. For example, as shown in FIG. 6A, the object information may be divided into equal portions (e.g., divided into five equal portions because the number of access points AP1 to AP5 is five) and transmitted to the access points.

Figure 6A:
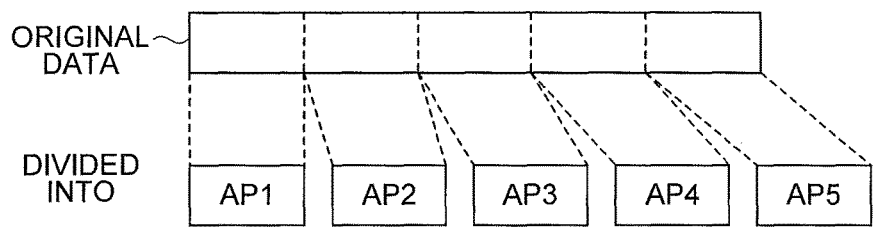
FIG. 6A is a diagram showing a first example of the division of object information.

FIG. 6A is a diagram showing a first example of the division of object information. As shown in FIG. 6A, original data is divided into five equal portions, which are allocated to the access points AP1 to AP5, respectively.

Figure 6B:
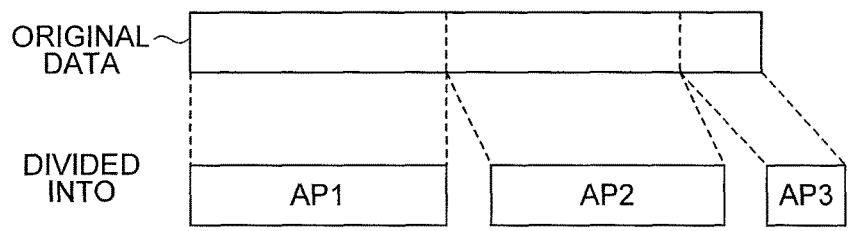
FIG. 6B is a diagram showing a second example of the division of object information.
Figure 6C:
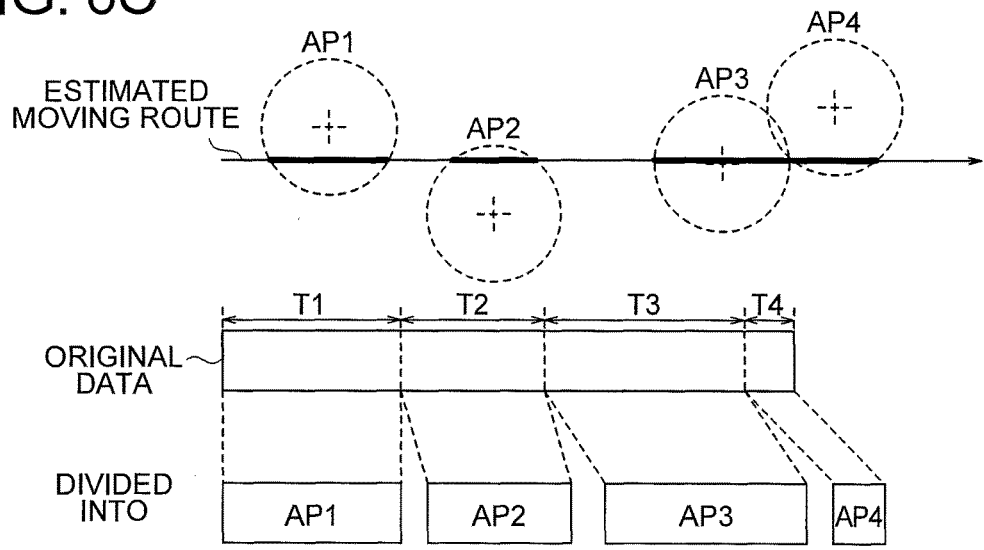
FIG. 6C is a diagram showing a third example of the division of object information.

In contrast, the original data may be divided and transmitted taking the moving status of the wireless terminal 101 (e.g., moving route and speed) into consideration (refer to FIG. 6B and FIG. 6C).

FIG. 6B is a diagram showing a second example of the division of object information. In FIG. 6B, data out of the object information is allocated to each access point in order from the access point AP1, the data having the amount of data obtained by multiplying the transmission speed of the wireless terminal 101 to staying time period for which the wireless terminal 101 stays within the communication area of the access point.

More specifically, in the example of FIG. 6B, a staying time period for which the wireless terminal 101 stays within the communication area of the access point AP1 is first predicted from the moving speed of the wireless terminal 101, and from the head of the object information, information having the amount of data obtained by multiplying the transmission speed of the wireless terminal 101 to this staying time period is determined as information to be transmitted by the access point AP1 itself. Next, a staying time period for which the wireless terminal 101 stays within the communication area of the access point AP2 is predicted from the moving speed of the wireless terminal 101, and from the head of the remaining object information, information having the amount of data obtained by multiplying the transmission speed of the wireless terminal 101 to this staying time period is determined as shared information that is shared with the access point AP2. Next, the remaining object information is determined as shared information that is shared with the access point AP3.

In the case of dividing original data as shown in FIG. 6B, the controller 207 performs the following processing. The controller 207 acquires first communication status information, which is communication status information on itself, from the monitor 210. In addition, the controller 207 acquires second communication status information, which indicates the status of the communication channel and/or communication of the other access point (relay device), from the other access point (relay device). Then, the controller 207 determines the amount of the shared information in accordance with at least one of the first communication status information and the second communication status information.

In addition, the controller 207 determines the transmitting destination of the shared information from among a plurality of other access points (relay devices) in accordance with at least one of the first communication status information and the second communication status information.

FIG. 6C is a diagram showing a third example of the division of object information. FIG. 6C shows an estimated moving route of the wireless terminal 101, and on this estimated moving route, the communication ranges of the access points AP1 to AP4 are shown by broken-line circles. Based on this estimated moving route, staying time periods within the communication area of the access points AP1 to AP4 are assumed to be T1 to T4, respectively. For this reason, from the head of original data, shared information having the amount of data for the staying time period T1 is allocated to the access point AP1. Then, from the head of the remaining data, shared information having the amount of data for the staying time period T2 is allocated to the access point AP2. Then, from the head of the remaining data, shared information having the amount of data for the staying time period T3 is allocated to the access point AP3. Then, from the head of the remaining data, shared information having the amount of data for the staying time period T4 is allocated to the access point AP4.

In the case of dividing object information (original data) as shown in FIG. 6C, the controller 207 performs the following processing.

The controller 207 acquires the moving status of the wireless terminal 101 and determines a staying time period for which the wireless terminal 101 stays within the wireless communication area of the other access point (relay device), using the acquired moving status of the wireless terminal 101. In more detail, the controller 207 determines the staying time period using information on the moving status of the wireless terminal 101 and the wireless communication range of the other access point (relay device). Then, the controller 207 determines the amount and/or transmitting destination of the shared information in accordance with the staying time period.

In addition, the controller 207 determines a staying time period for which the wireless terminal 101 stays within the wireless communication area of the access point (relay device) using communication status information obtained through monitoring by the monitor 210. In more detail, the controller 207 determines the staying time period using the communication status information and information on the wireless communication range of the access point (relay device). Then, the controller 207 determines the separating position used to separate shared information from data to be transmitted, using the determined staying time period. Note that, at that point, the controller 207 may determine the separating position of a head used to extract the shared information from the data to be transmitted in accordance with the determined staying time period and the transmission speed of the access point (relay device).

(Detail of Division Manner Taking Moving Status into Consideration)

Detail of a dividing method taking a moving status into consideration will be described below. The access point AP1 comprehends the status of a wireless communication channel by causing the monitor 210 to monitor the wireless I/F 201 and the communicator 204. At this point, by focusing on a frame exchanged with a particular wireless terminal 101, the communication status with the wireless terminal 101 can be comprehended. The controller 207 acquires information, for example, on the distance between the wireless terminal 101 and the access point AP1, a moving speed, and a moving direction (e.g., moving toward or away from it), using this information.

When the application executor 206 is transmitting information to the wireless terminal 101 as a response, the communicator 204 of the access point AP1 can receive many ACK frames from the wireless terminal 101, and thus the communicator 204 can continuously comprehend a received radio field intensity with respect to, for example, frames transmitted by the wireless terminal 101.

As an example of the determination, the controller 207 can determine that the wireless terminal 101 is moving toward it when the received radio field intensity gradually increases, or determine that the wireless terminal 101 is moving away from it when the received radio field intensity gradually decreases. Alternatively, the controller 207 may calculate the proportion of change in the received radio field intensity and compare it with a predetermined model between radio field intensity and distance to determine the moving speed of the wireless terminal 101. Here, the model between radio field intensity and distance may be theoretically derived or may be created from actual measurement data obtained by actually causing a wireless terminal to move at various speeds.

In addition, the pieces of data may be continuously updated by obtaining cooperation from the wireless terminal 101 providing information on the movement (e.g., information on displacement in position and acceleration) to the access point AP1. In such a manner, the controllers 207 of the access points AP1 to AP4 each have any model and can predict the moving status of the wireless terminal 101 using the information on the model.

Note that the application executor 206 may estimate the moving status of the wireless terminal 101 by causing the application running on the application executor 206 to perform these processes. In that case, the controller 207 may acquire the estimated moving status.

Alternatively, unlike the above-mentioned method, the moving status of the wireless terminal 101 may be comprehended using positional information indicating the position of the wireless terminal 101. For example, assume that the application executor 206 executes a function of recording the position of the wireless terminal on a time series basis. In this case, the controller 207 may find a moving distance from a plurality of pieces of positional information and divide the moving distance by a required time to calculate the moving speed.

Similarly, the controller 207 may calculate the moving direction from a plurality of pieces of positional information. Then, the controller 207 may predict a future moving status (e.g., moving route and speed) using the calculated moving direction and moving speed.

In addition, in the case where the access point AP1 comprehends the moving status of the wireless terminal 101, a staying time period for which the wireless terminal 101 stays within the communication area of each access point may be estimated by referring to communication range information indicating the preset communication range of the access points AP1 to AP5. Here, the pieces of communication range information are comprehended in advance, for example, at the time of installing the access points, and thus the controller 207 holds the communication ranges in terms of distance or radio field intensity.

The controller 207 calculates the amount of information that can be transmitted during this staying time period as the amount of shared information, from a staying time period and a transmission speed (e.g., link speed or a value based on an expected speed in an application level) at the access point AP1. The controller 207 performs this calculation for also the other access points AP2 to AP5. The amounts of shared information to be transmitted to the respective access points AP2 to AP5 are thereby calculated.

Then, the controller 207 divides data to be transmitted into pieces having the calculated amounts of shared information. The data to be transmitted is thereby divided into pieces having sizes in conformity with the staying time periods and the transmission speeds at the respective access points, and the pieces of shared information obtained by the division are transmitted to the corresponding access points. In such a manner, the controller 207 may determine the amount and/or transmitting destination of shared information in accordance with the staying time periods for which the wireless terminal 101 stays within the communication area of the other access points (relay devices) as well as the transmission speeds at the other access points (relay devices).

At the time of dividing and sharing information, if there are many access points that can share the information, object information may not be shared among all the access points. For example, the object information may be shared among only the first several access points. Alternatively, if the object information is found in advance to be information, such as a content (e.g., video), for which it takes a certain period of time to be played back, an predicted arrival times at which the wireless terminal 101 reaches the communication areas of the access points AP may be determined from the moving speed of the wireless terminal 101, and the transmitting destinations of pieces of shared information may be determined using the predicted arrival times and the playback time period of the information.

Here, the controller 207 may increase the sizes of the pieces of shared information obtained by the division to be larger than the calculated sizes, assuming an error relating to the staying time periods. Alternatively, the controller 207 may perform the division such that the pieces of shared information overlap.

Figure 6D:
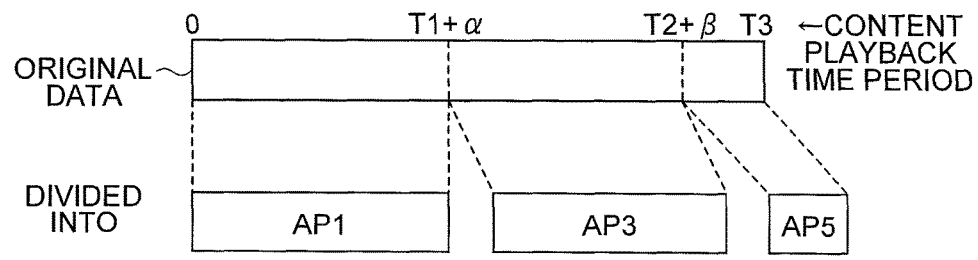
FIG. 6D is a diagram showing a fourth example of the division of object information.

FIG. 6D is a diagram showing a fourth example of the division of object information. It is assumed that the wireless terminal 101 moves in the communication ranges of the access points AP1, AP2, AP3 and AP4 in this order, as shown by the estimated moving route in FIG. 6C. In FIG. 6D, it is assumed that if original data is a content, the volume of data equivalent to a playback time period $T1+\alpha$ is allocated to the access point AP1. This playback time period $T1+\alpha$ is determined from a staying time period for which the wireless terminal 101 stays within the communication area of the access point AP1 and a data transfer speed from the access point AP1 to the wireless terminal 101 (transmission speed on a downlink).

In FIG. 6D, from the moving time of the wireless terminal 101, an predicted arrival time at which the wireless terminal 101 reaches within the communication area of the access point AP3 is determined as T1. The playback time period of first shared information that is received from the access point AP1 is $T1+\alpha$, and thus the playback of the first shared information is not finished in the wireless terminal 101 until the wireless terminal 101 reaches within the communication area of the access point AP3. For this reason, the wireless terminal 101 does not need to receive data at the access point AP2.

From the moving time of the wireless terminal 101, an predicted arrival time at which the wireless terminal 101 reaches within the communication area of the access point AP5 is determined as T2. The playback time period of second shared information that is received from the access point AP2 is $(T2+\beta-T1-\alpha)$ $(\beta>\alpha)$, and thus the playback of the second shared information is not finished in the wireless terminal 101 until the wireless terminal 101 reaches within the communication area of the access point AP5. For this reason, the wireless terminal 101 does not need to receive data at the access point AP4. Therefore, in the example of FIG. 6D, the transmitting destinations of the pieces of shared information are determined as AP1, AP3, and AP5.

In the case of dividing object information (original data) as shown in FIG. 6D, the controller 207 performs the following processing. The controller 207 acquires the moving status of the wireless terminal 101 and determines the amount of data to be transmitted to the wireless terminal 101 within the wireless communication area of the access point (relay device) using the moving status of the wireless terminal 101 and the wireless communication range of the relay device. Then, the controller 207 determines the transmitting destinations of the pieces of shared information from among a plurality of the other access points (relay devices) using a playback time period for which content is played back by the determined amount of data and the moving status of the wireless terminal 101.

More specifically, for example, the controller 207 determines a first access point and a second access point, which have wireless communication ranges on the moving route of the wireless terminal 101, in order along the moving route using the moving status of the wireless terminal 101, and determines an estimated arrival time at which the wireless terminal 101 reaches within the wireless communication area of the determined second access point. The controller 207, for example, compares the determined above-described playback time period with the determined estimated arrival time and determines the transmitting destinations of the shared information in accordance with the comparison result. In more detail, if the playback time period is shorter than the estimated arrival time, the first access point is determined as the transmitting destination of the shared information. It is thereby possible to prevent the playback from stopping before the wireless terminal 101 reaches within the wireless communication area of the second access point. In contrast, if the playback time period is longer than or equal to the estimated arrival time, the second access point is determined as the transmitting destination of the shared information.

Figure 7:
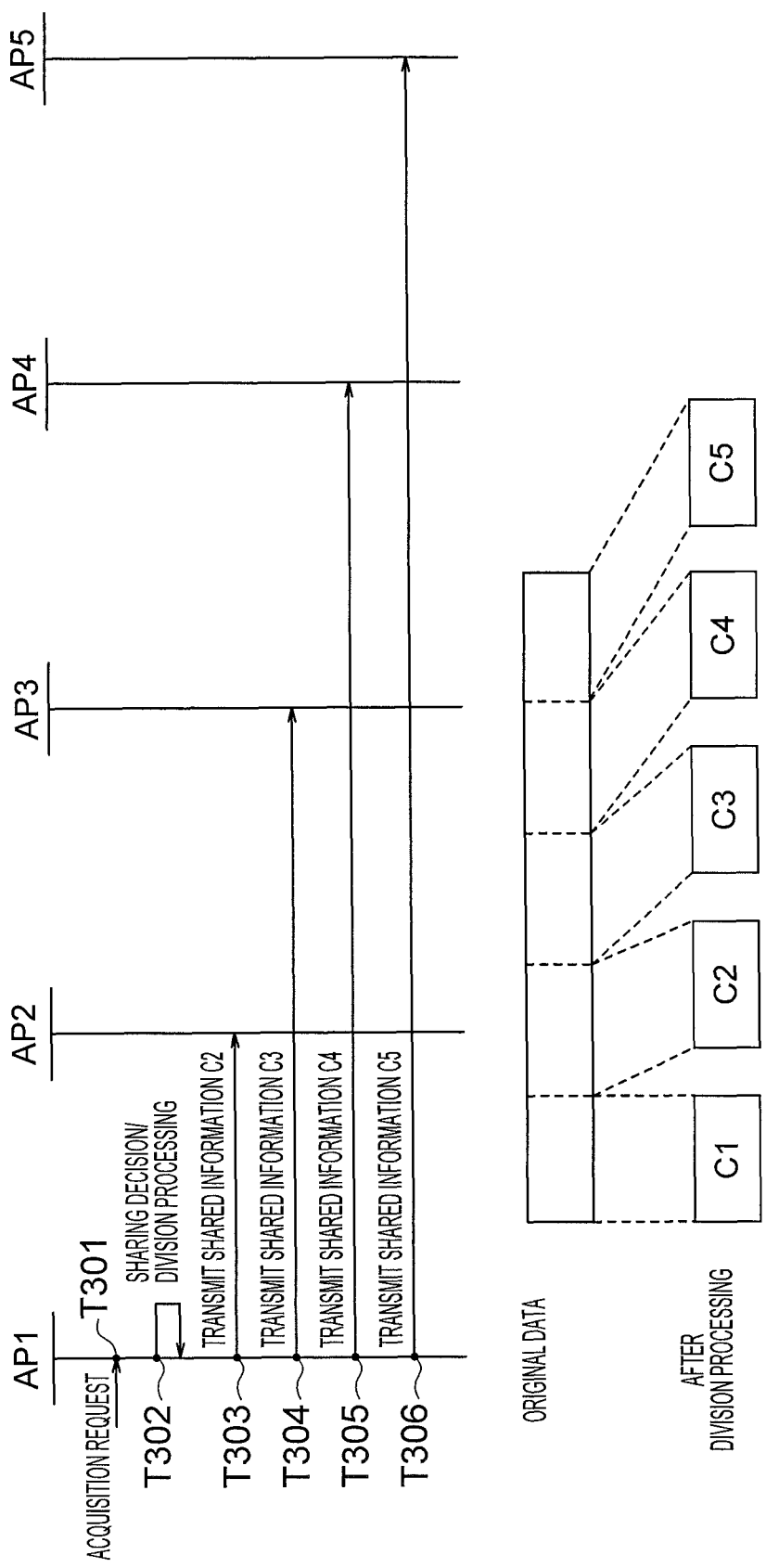
FIG. 7 is a sequence diagram showing an example of the flow of shared information distribution processing in the first embodiment.

In the present embodiment, as shown in FIG. 7, the access point AP1 distributes the pieces of shared information into which the object information is divided to the other access points AP2 to AP5.

FIG. 7 is a sequence diagram showing an example of the flow of shared information distribution processing in the first embodiment.

(T301) First, the controller 207 of the access point AP1 receives an acquisition request for object information from the wireless terminal 101.

(T302) Next, the controller 207 of the access point AP1 decides whether or not the transmission of object information that is requested using the communication request to the wireless terminal 101 can be completed with the access point AP1. Here, as an example, it is assumed that the result of the decision indicates that the transmission cannot be completed. Since the result of the decision indicates that the transmission cannot be completed, the controller 207 of the access point AP1 determines how to divide the object information. It is thereby determined, as shown in FIG. 7, the object information (original data) is divided into shared information C1, shared information C2, shared information C3, shared information C4, and shared information C5.

(T303) Next, the controller 207 of the access point AP1 causes the communicator 204 to transmit the shared information C2 to the access point AP2.

(T304) Next, the controller 207 of the access point AP1 causes the communicator 204 to transmit the shared information C3 to the access point AP3.

(T305) Next, the controller 207 of the access point AP1 causes the communicator 204 to transmit the shared information C4 to the access point AP4.

(T306) Next, the controller 207 of the access point AP1 causes the communicator 204 to transmit the shared information C5 to the access point AP5.

Figure 8:
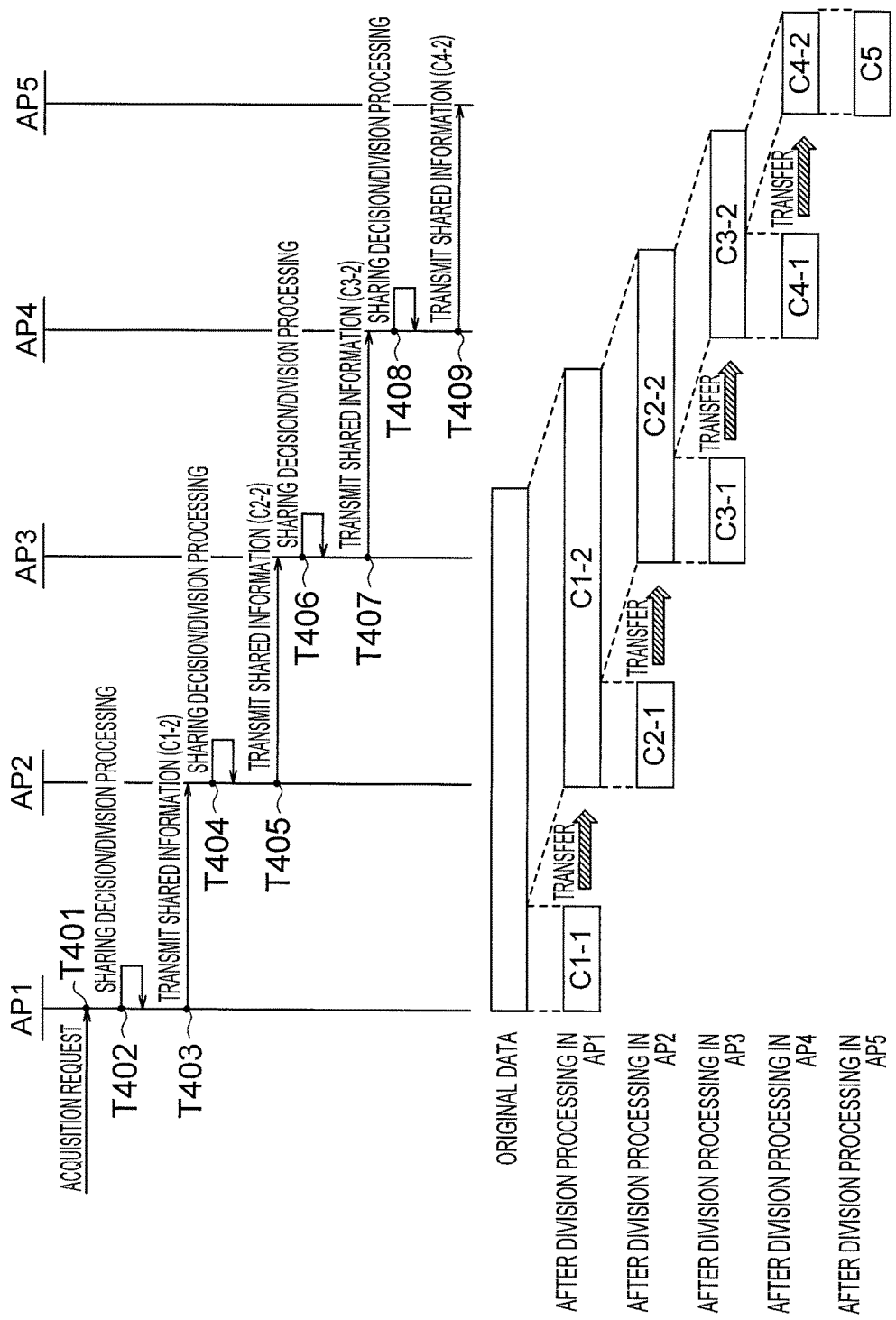
FIG. 8 is a sequence diagram showing a modification of the flow of the shared information distribution processing in the first embodiment.

Note that, as shown in FIG. 8, each access points APi may perform the above-described decision and transmit to subsequent access point remaining information out of the object information except for information that the access point APi transmits to the wireless terminal 101 if the transmission of object information to the wireless terminal 101 cannot be completed with the access point APi. Here, the subsequent access point is an access point that is estimated from the moving route of the wireless terminal 101, the access point forming a wireless network the communication area of which the wireless terminal 101 next enters.

FIG. 8 is a sequence diagram showing a modification of the flow of the shared information distribution processing in the first embodiment. In FIG. 8, the description will be made below assuming that an estimated moving route of the wireless terminal 101 is a route passing through communication areas of the access points AP1 to AP5 in order.

(T401) First, the controller 207 of the access point AP1 receives an acquisition request for object information from the wireless terminal 101.

(T402) Next, the controller 207 of the access point AP1 decides whether or not the transmission of the object information that is requested using the communication request to the wireless terminal 101 can be completed with the access point AP1. Here, as an example, it is assumed that the result of the decision indicates that the transmission cannot be completed. Since the result of the decision indicates that the transmission cannot be completed, the controller 207 of the access point AP1 determines a first amount of data to be transmitted to the wireless terminal 101 by the access point AP1 using the communication status information acquired by the monitor 210 and the moving status of the wireless terminal 101. Then, the controller 207 of the access point AP1, for example, determines the first amount of data from the head of the object information as information C1-1 to be transmitted by the access point AP1. The information C1-1 and shared information C1-2 are thereby determined, as shown in FIG. 8, the information C1-1 of the object information (original data) being to be transmitted by the access point AP1, and the shared information C1-2 being remaining information out of the object information (original data) except for the information C1-1.

(T403) Next, the controller 207 of the access point AP1 transmits this shared information C1-2 to the access point AP2.

(T404) Next, the controller 207 of the access point AP2 decides whether or not the transmission of the shared information C1-2 to the wireless terminal 101 can be completed with the access point AP2. Here, as an example, it is assumed that the result of the decision indicates that the transmission cannot be completed. Since the result of the decision indicates that the transmission cannot be completed, the controller 207 of the access point AP2 determines a second amount of data to be transmitted to the wireless terminal 101 by the access point AP2 using the communication status information acquired by the monitor 210 and the moving status of the wireless terminal 101. Then, the controller 207 of the access point AP2, for example, determines the second amount of data from the head of the shared information C1-2 as information C2-1 to be transmitted by the access point AP2. The information C2-1 and shared information C2-2 are thereby determined, as shown in FIG. 8, the information C2-1 of the shared information C1-2 being to be transmitted by the access point AP2, and the shared information C2-2 being remaining information out of the shared information C1-2 except for the information C2-1.

(T405) Next, the controller 207 of the access point AP2 transmits this shared information C2-2 to the access point AP3.

(T406) Next, the controller 207 of the access point AP3 performs processing similar to that in T404. Information C3-1 and shared information C3-2 are thereby determined, as shown in FIG. 8, the information C3-1 of the shared information C2-2 being to be transmitted by the access point AP3, and the shared information C3-2 being remaining information out of the shared information C2-2 except for the information C3-1.

(T407) Next, the controller 207 of the access point AP3 transmits this shared information C3-2 to the access point AP4.

(T408) Next, the controller 207 of the access point AP4 performs processing similar to that in T404. Information C4-1 and shared information C4-2 are thereby determined, as shown in FIG. 8, the information C4-1 of the shared information C3-2 being to be transmitted by the access point AP4, the shared information C4-2 being remaining information out of the shared information C3-2 except for the information C4-1.

(T409) Next, the controller 207 of the access point AP4 transmits this shared information C4-2 to the access point AP5. Next, the controller 207 of the access point AP5 decides whether or not the transmission of the shared information C4-2 to the wireless terminal 101 can be completed with the access point AP5. Here, as an example, it is assumed that the result of the decision indicates that the transmission can be completed, the controller 207 of the access point AP5 causes the communicator 204 to transmit this shared information C4-2 to the wireless terminal 101 as transmitted information C5.

Furthermore, at the time of transferring information from a previous access point to the subsequent access point, cache information may be exchanged between a transferring destination access point and a transferring source access point. For example, the controller 207 of the transferring destination access point checks whether or not shared information to be received is saved in the temporary storage 208 thereof and notifies the controller 207 of the transferring source access point of the saving status (including the case where a part of the shared information is saved). Then, the controller 207 of the transferring source access point may refer to the notified saving information and transfer only a part of information that is not held. At this point, partial information may be an aggregation of fragmented pieces of information having a fixed length that is determined in advance to specifications or the like or may be a chunk of information having any length.

Figure 9:
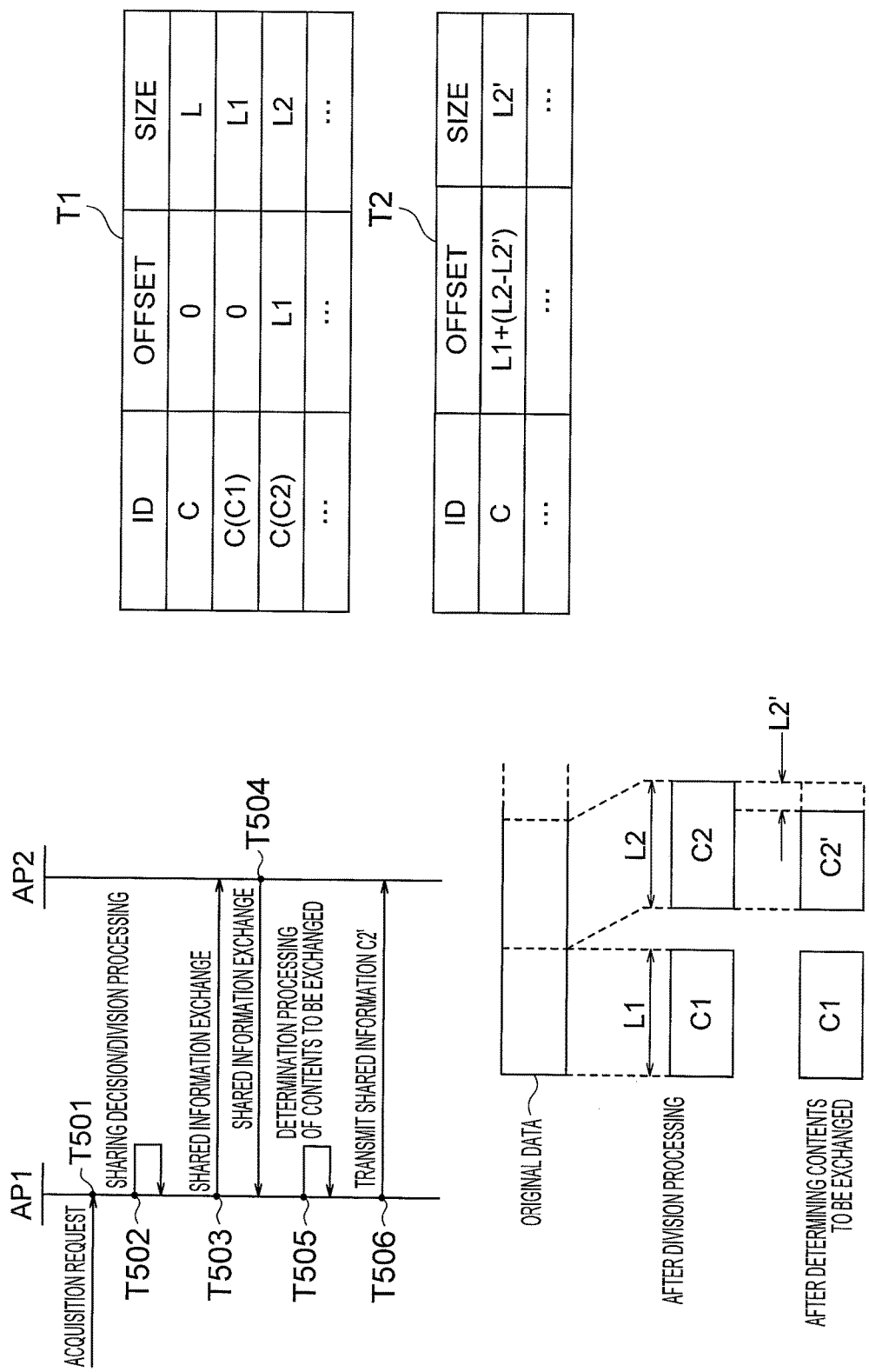
FIG. 9 is a diagram for illustrating processing of transferring only a part of information that is not held by a transferring source access point.

FIG. 9 is a diagram for illustrating processing of transferring only a part of information that is not held by the transferring source access point. This example shows distribution of object information to the access point AP2, which is a part of the case where the object information is divided by the access point AP1 and distributed to the access points as with the division example thus far. The access point AP1 holds information as shown in table T1, and the access point AP2 holds information as shown in table T2. In the table T1 and the table T2, the item "ID" is an ID with which information can be uniquely identified, and is a URL or a hash value derived from the URL.

For example, the first row in the table T1 indicates that a content having an ID of C has a size of L. C(C1) and C(C2) are entries that are created for distributing C to the access points through division processing. With reference to the information C, C(C1) has an offset of zero and a size of L1, and C(C2) has an offset of L1 and a size of L2. In addition, as shown by the first row in the table T2, the access point AP2 holds fragmented information in which the information C, which has the same ID, has an offset of L1+(L2−L2') and a size of L2'.

(T501) First, the controller 207 of the access point AP1 receives an acquisition request for object information from the wireless terminal 101.

(T502) Next, the controller 207 of the access point AP1 decides whether or not the transmission of the object information that is requested using the communication request to the wireless terminal 101 can be completed with the access point AP1. Here, as an example, it is assumed that the result of the decision indicates that the transmission cannot be completed. Since the result of the decision indicates that the transmission cannot be completed, the controller 207 of the access point AP1 determines a first amount of data to be transmitted to the wireless terminal 101 by the access point AP1 using the communication status information acquired by the monitor 210 and the moving status of the wireless terminal 101. Then, the controller 207 of the access point AP1, for example, determines the first amount of data from the head of the object information as information C1 to be transmitted by the access point AP1. The information C1 and shared information C2 are thereby determined, as shown in FIG. 9, the information C1 of the object information (original data) being to be transmitted by the access point AP1, and the shared information C2 being remaining information out of the object information (original data) except for the information C1.

(T503) Next, the controller 207 of the access point AP1 notifies the access point AP2 of meta information on the shared information C (C2) (here, as an example, a couple of the offset and the size).

(T504) Next, the controller 207 of the access point AP2 compares the notified meta information with meta information held by itself and comprehends that the access point AP2 does not hold the first half portion of information that the access point AP1 tries to share. In response to this, the controller 207 of the access point AP2 transmits information to identify the first half portion necessary to be acquired (e.g., a couple of the offset L1 and the size L2−L2') to the access point AP1 as a response.

(T505) Next, the controller 207 of the access point AP1 receiving the response determines shared information C2' to be transmitted to the access point AP2 using the information to identify the first half portion necessary to be acquired by the access point AP2.

(T506) Next, the controller 207 of the access point AP1 transmits the shared information C2' from the communicator 204 to the access point AP2.

Note that although the controller 207 of the access point AP2 generates the response based on the information notified from the access point AP1 but is not limited thereto. The controller 207 of the access point AP2 may notify the access point AP1 of meta information on the information C (e.g., the couple of the offset L1+(L2−L2') and the size L2') held by itself, and the access point AP1 may determine meta information on the shared information to be transmitted to the access point AP2 (in this case, the couple of the offset L1 and the size L2−L2') based on the meta information on this information C.

In any case, the access point AP1 may only transmit the first half portion of the shared information C2, and thus the amount of information necessary for the sharing can be reduced, which allows a time taken to transfer the shared information to be shortened. Although the description is made here between the access point AP1 and the access point AP2, but the same is applicable for between the access point AP1 and the other access points. Furthermore, the same is applicable for the case of determining whether or not the sharing is necessary for each access point. In addition, the present embodiment is described about the case where an offset and a size are held as meta information but is not limited thereto, and in the case of the division into fragments having a fixed length, only information to identify the position of a fragment (e.g., sequential numbers in which the first fragment has a number one) may be held.

In such a manner, the controller 207 acquires meta information on a part of information out of the shared information that is held by the other access point and causes the communicator 204 to transmit information out of the shared information that is not held by the other relay device to the other relay device using this meta information. The amount of information transmitted to the other relay device is thereby reduced, which allows a communication duration taken for this transmission to be shortened.

Note that there may be different wireless terminals moving in different directions. For example, in FIG. 1, there may be either a wireless terminal moving in the x-axis positive direction or a wireless terminal moving in the x-axis negative direction.

If pieces of shared information are transferred from the access point AP1 to the access points AP2, AP3, AP4, and AP5 in this order, the access point AP5 can save only the last part of object information.

For that reason, the access point AP1 may distribute information to identify each access point (here, information to identify the access point AP1) associating it with meta information on shared information transferred to each access point. Then, when receiving an acquisition request of object information from a wireless terminal other than the wireless terminal 101, each access point may determine an access point that holds information out of object information that is not held by itself (hereafter, referred to as an insufficient part) using the distributed meta information, and directly acquire this lacking part from the access point holding this lacking part.

(Existence Confirmation Between Access Points)

Next, there will be described existence confirmation between access points using a plurality of access points necessary for the download processing. To implement the above-described cooperation between access points, it is necessary for the access points to comprehend one another's existences and check that a cooperating function is installed. In a method therefor, the access points may use existing communications protocols. Here, the existing communications protocols include, for example, Simple Service Discovery Protocol (SSDP), Link Layer Discovery Protocol (LLDP), and the like. The access points can recognize the existence with each other using these communications protocols, and can check the installed functions if necessary, by combining the other means.

(Update of Cache Content)

Next, the update of a cache content will be described. The above-described procedure does not include a step of checking the validity of information saved in the temporary storage 208 (e.g., within its term of validity or not). For this step, confirmation processing may be performed as with typical cache servers. However, the description will not be made in detail in the present embodiment.

Figure 10:
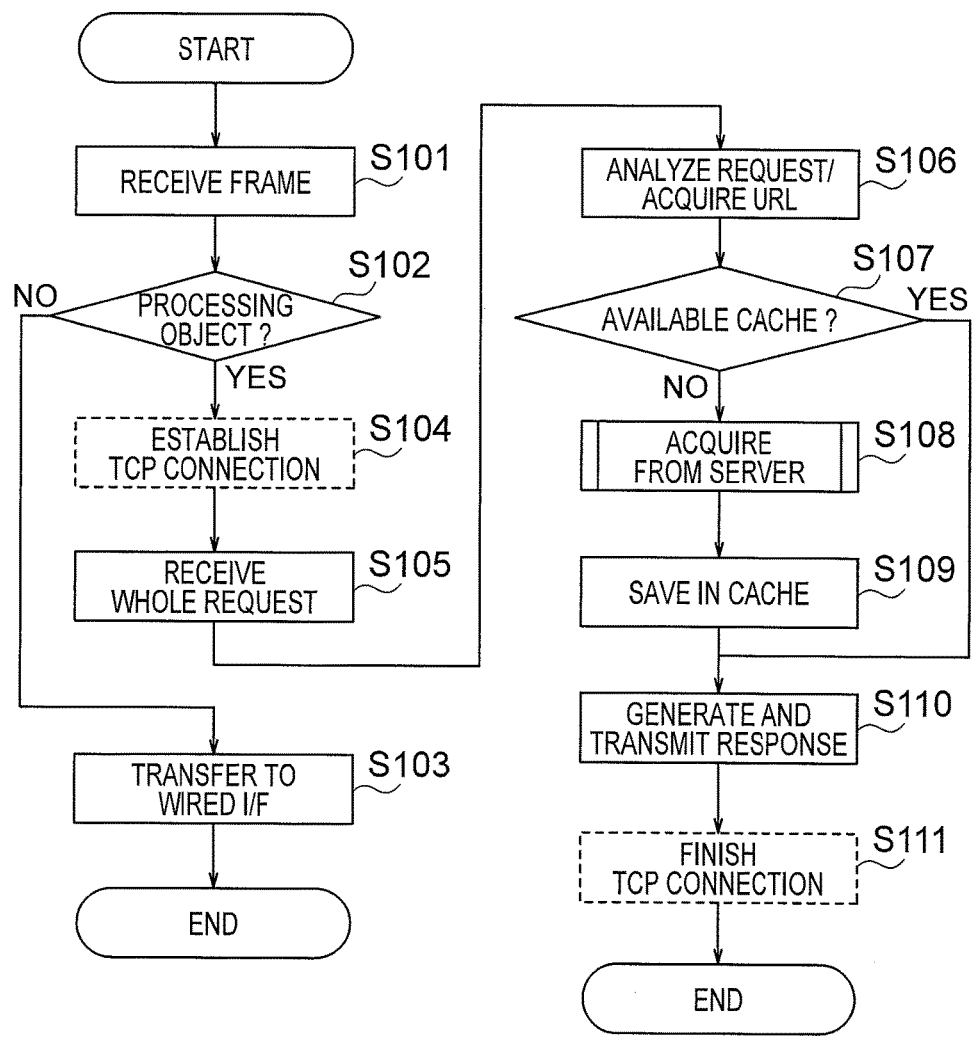
FIG. 10 is a flow chart showing an example of the flow of information cache processing by the access point AP in the first embodiment.

Next, the operation of the access point will be described with reference to FIG. 10 to FIG. 12. FIG. 10 is a flow chart showing an example of the flow of information cache processing by the access point AP in the first embodiment.

(Step S101) First, the wireless I/F 201 wirelessly receives a frame.

(Step S102) Next, the detector 203 decides whether or not the frame received in step S101 is a processing object.

(Step S103) If it is decided in step S102 that the frame is not a processing object, the transferor 202 transfers the frame received in step 101 to the wired I/F 200.

(Step S104) If it is decided in step S102 that the frame is a processing object, the communicator 204 establishes a TCP connection.

(Step S105) Then, the communicator 204 receives the whole request from the wireless terminal 101.

(Step S106) Next, the application executor 206 analyzes the request and acquires the URL of object information that is requested to be acquired by the wireless terminal 101.

(Step S107) Next, the controller 207 decides whether or not the object information is cached in the temporary storage 208.

(Step S108) If it is decided in step S107 that the object information is not cached in the temporary storage 208, the application executor 206 acquires the object information from the server 102.

(Step S109) Then, the controller 207 causes the temporary storage 208 to store the object information acquired in step S108.

(Step S110) After step S109, or if it is decided in step S107 that the object information is cached in the temporary storage 208, the controller 207 generates a response and causes the communicator 204 to transmit the generated response to the wireless terminal 101.

(Step S111) Then, the communicator 204 disconnects the TCP connection.

Figure 11:
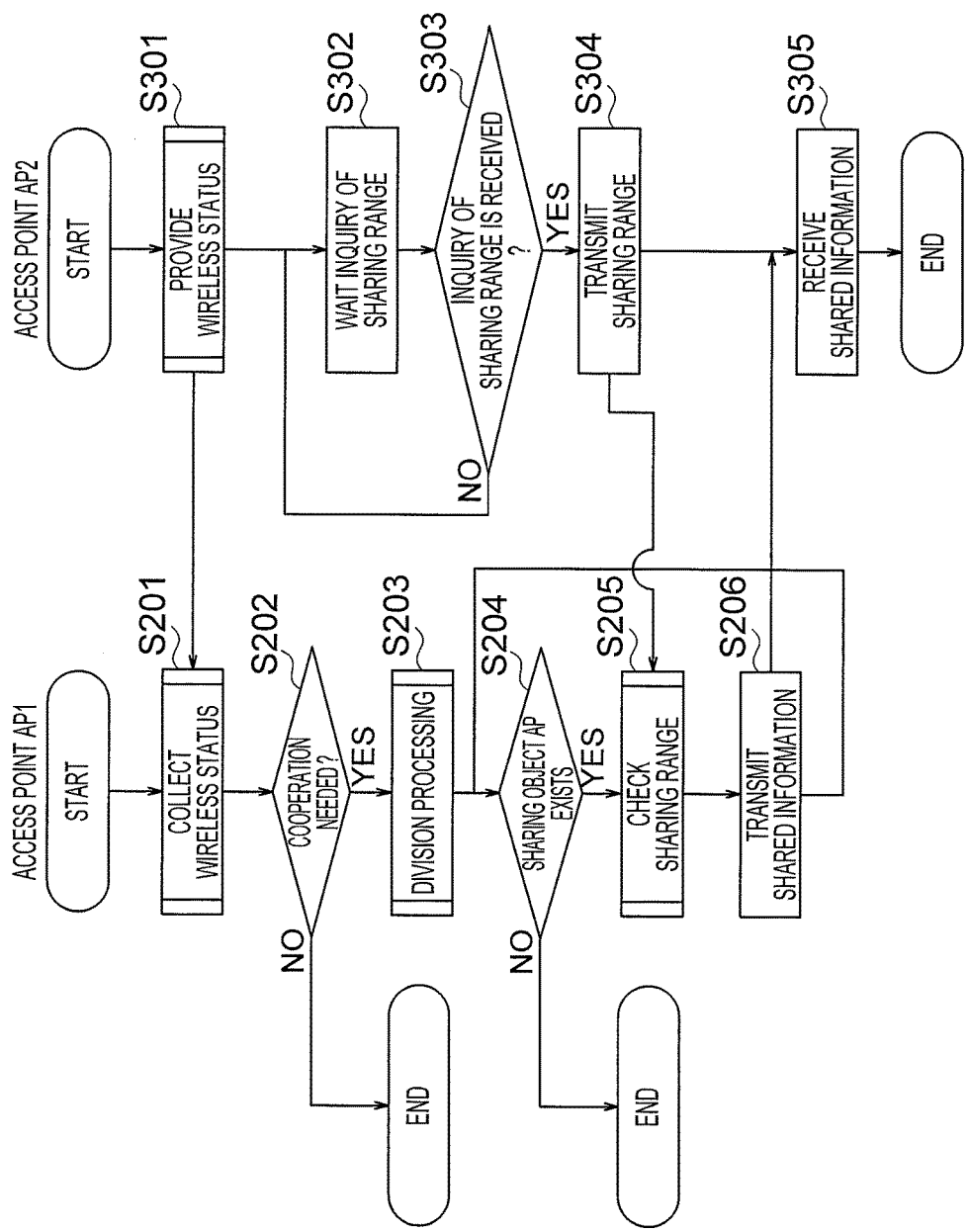
FIG. 11 is a flow chart showing an example of the flow of cooperation processing by the access point AP in the first embodiment.

FIG. 11 is a flow chart showing an example of the flow of cooperation processing by the access point AP1 in the first embodiment. Here, the description will be made about the cooperation between the access point AP1 and the access point AP2 as a representative example of the cooperation between the access point AP1 and the other access points AP2 to AP5. A series of the processes in FIG. 11 is processing performed by the controller 207 of each access point.

(Step S301) First, the controller 207 of the access point AP2 provides the wireless communication status thereof to the access point AP1. For example, the controller 207 of the access point AP2 transmits to the access point AP1 second communication status information that represents the status of a communication channel and/or communication of the wireless network thereof.

(Step S302) Then, the controller 207 of the access point AP2 waits for an inquiry of sharing range from the access point AP1.

(Step S201) Next, the controller 207 of the access point AP1 collects the status of the wireless communication thereof and the status of the wireless communication of the access point AP2. For example, the controller 207 of the access point AP1 acquires first communication status information that represents the status of the communication channel and/or communication in the wireless network thereof. In addition, the controller 207 of the access point AP1 acquires the second communication status information from the access point AP2.

(Step S202) Next, the controller 207 of the access point AP1 decides whether or not the transmission of object information that is requested using the communication request to the wireless terminal 101 can be completed with the access point AP1. If it is decided that the transmission cannot be completed, cooperation is needed.

(Step S203) If it is decided in step S202 that the transmission of the object information to the wireless terminal 101 cannot be completed with the access point AP1, which means that cooperation is needed, the controller 207 of the access point AP1 determines how to divide the object information.

(Step S204) Next, the controller 207 of the access point AP1 decides whether or not there is any access point being a sharing object using the moving status of the wireless terminal 101. The access points AP2 to AP5 are then detected.

(Step S205) If it is decided in step S204 that there are some access points being sharing objects, the controller 207 of the access point AP1 performs processing of checking what ranges the access points AP2 to AP5 have already held out of shared information to be shared among the access points AP2 to AP5. Here, as a representative example of this, the controller 207 of the access point AP1 inquires a range that the access point AP2 has already held out of shared information to be shared with the access point AP2.

(Step S303) The controller 207 of the access point AP2 decides whether or not it has received the inquiry of the sharing range. If the inquiry of the sharing range has not been received, the processing returns to step S302, and the controller 207 of the access point AP2 waits for the inquiry of the sharing range.

(Step S304) If it is decided in step S303 that the inquiry of the sharing range has been received, the controller 207 of the access point AP2 transmits a sharing range of information having been already held to the access point AP1 as a response.

(Step S206) Next, the controller 207 of the access point AP1, using the response from the access point AP2, determines remaining part of shared information except for the sharing range as new shared information and transmits the determined shared information to the access point AP2.

(Step S305) The controller 207 of the access point AP2 receives the shared information that is transmitted in step S206.

Figure 12A:
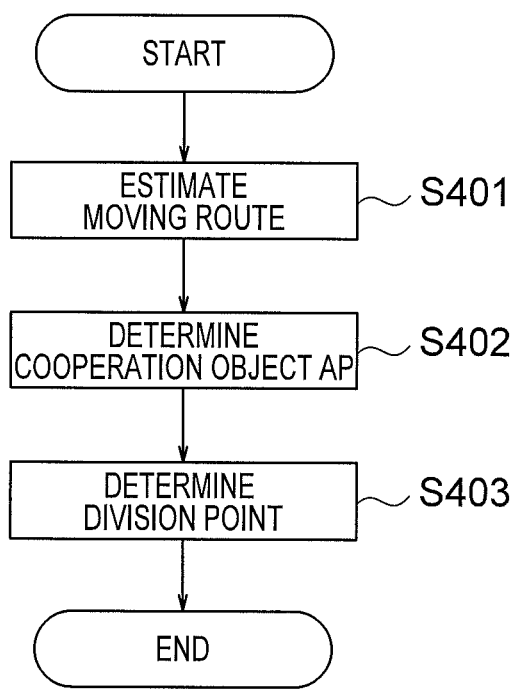
FIG. 12A is a flow chart showing a first example of the determination processing of how to divide object information.

Next, determination processing of how to divide object information will be described with reference to FIG. 12A to FIG. 12C. FIG. 12A is a flow chart showing a first example of the determination processing of how to divide object information. The processing in FIG. 12A is an example of the case where object information is equally divided as in FIG. 6A.

(Step S401) First, the controller 207 estimates the moving route of the wireless terminal 101.

(Step S402) Next, the controller 207 determines an access point that has a wireless communication range on the moving route of the wireless terminal 101, as a cooperation object access point.

(Step S403) Next, the controller 207 determines division points such that the object information is equally divided between itself and the cooperation object access point.

Note that the controller 207 may determine the division points in such a manner that the object information is segmented into pieces each having a predetermined amount of data.

Figure 12B:
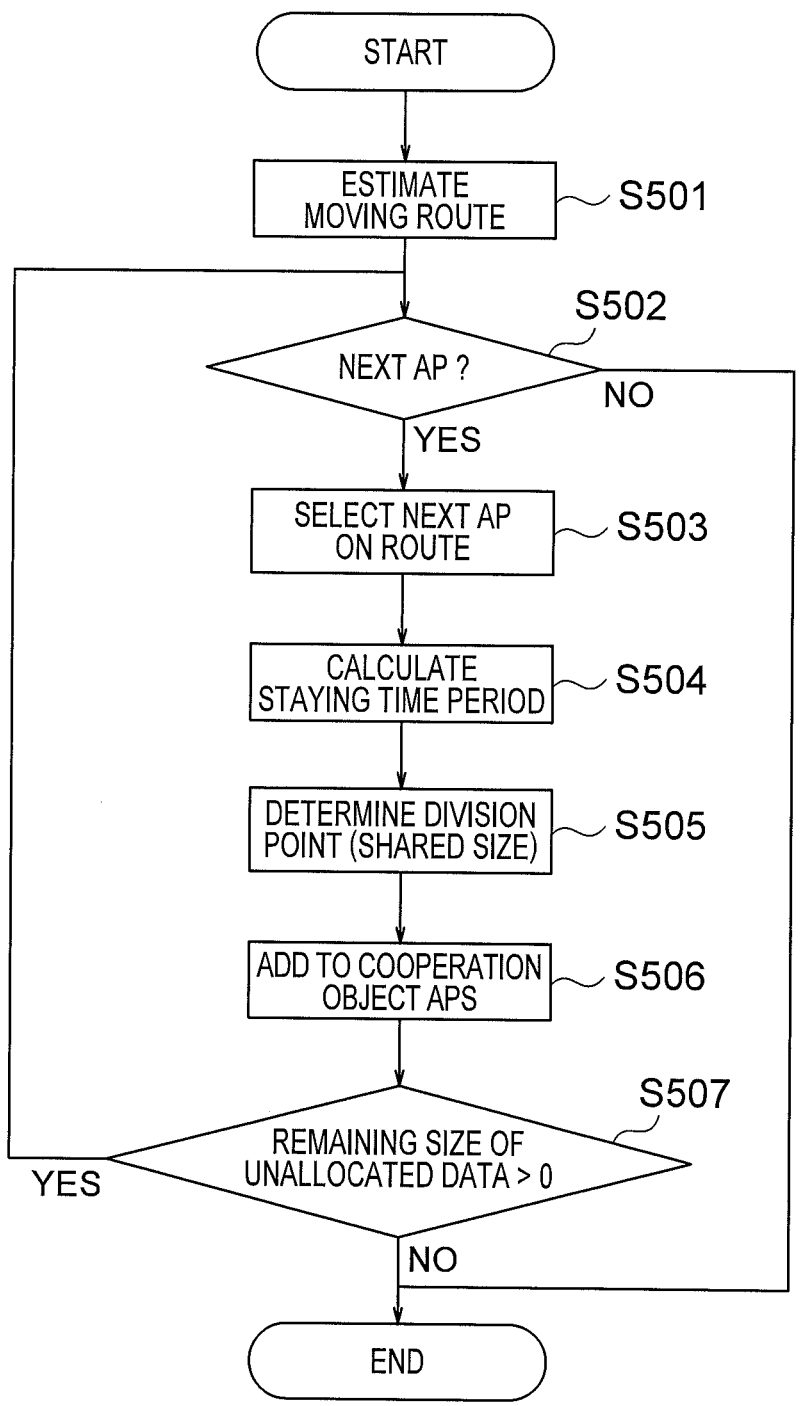
FIG. 12B is a flow chart showing a second example of the determination processing of how to divide object information.

FIG. 12B is a flow chart showing a second example of the determination processing of how to divide object information. FIG. 12B is an example of the case, as in FIG. 6C, of predicting staying time periods for which the wireless terminal 101 stays within communication areas from the moving speed of the wireless terminal 101 and performing the division taking these staying time periods into consideration.

(Step S501) First, the controller 207 estimates the moving route of the wireless terminal 101.

At this point, the controller 207 also acquires the moving speed of the wireless terminal 101.

(Step S502) Next, controller 207 decides whether or not there is the next access point having a wireless communication range on the estimated moving route. If there is no next access point, the controller 207 finishes the determination processing of how to divide object information.

(Step S503) If it is decided in step S502 that there is the next access point, the controller 207 selects the next access point having a wireless communication range on the moving route.

(Step S504) Next, the controller 207 determines a staying time period for which the wireless terminal 101 stays within the communication area of the object access point selected in step S503.

(Step S505) Next, the controller 207 determines the amount of data of shared information (shared size) to be transmitted to the object access point selected in step S503 using the staying time period determined in step S504 and the transmission speed of the wireless terminal 101 and determines the next division point at which the object information is divided.

(Step S506) Next, the controller 207 adds the object access point selected in step S503 to cooperation object access point.

(Step S507) Next, the controller 207 decides whether or not a remaining size of data that is unallocated out of the object information is larger than zero. If the remaining size of the unallocated data is larger than zero, the processing returns to step S502, and the processing following step S502 is repeated. In contrast, if the remaining size of the unallocated data is zero, the controller 207 finishes the determination processing of how to divide object information.

Figure 12C:
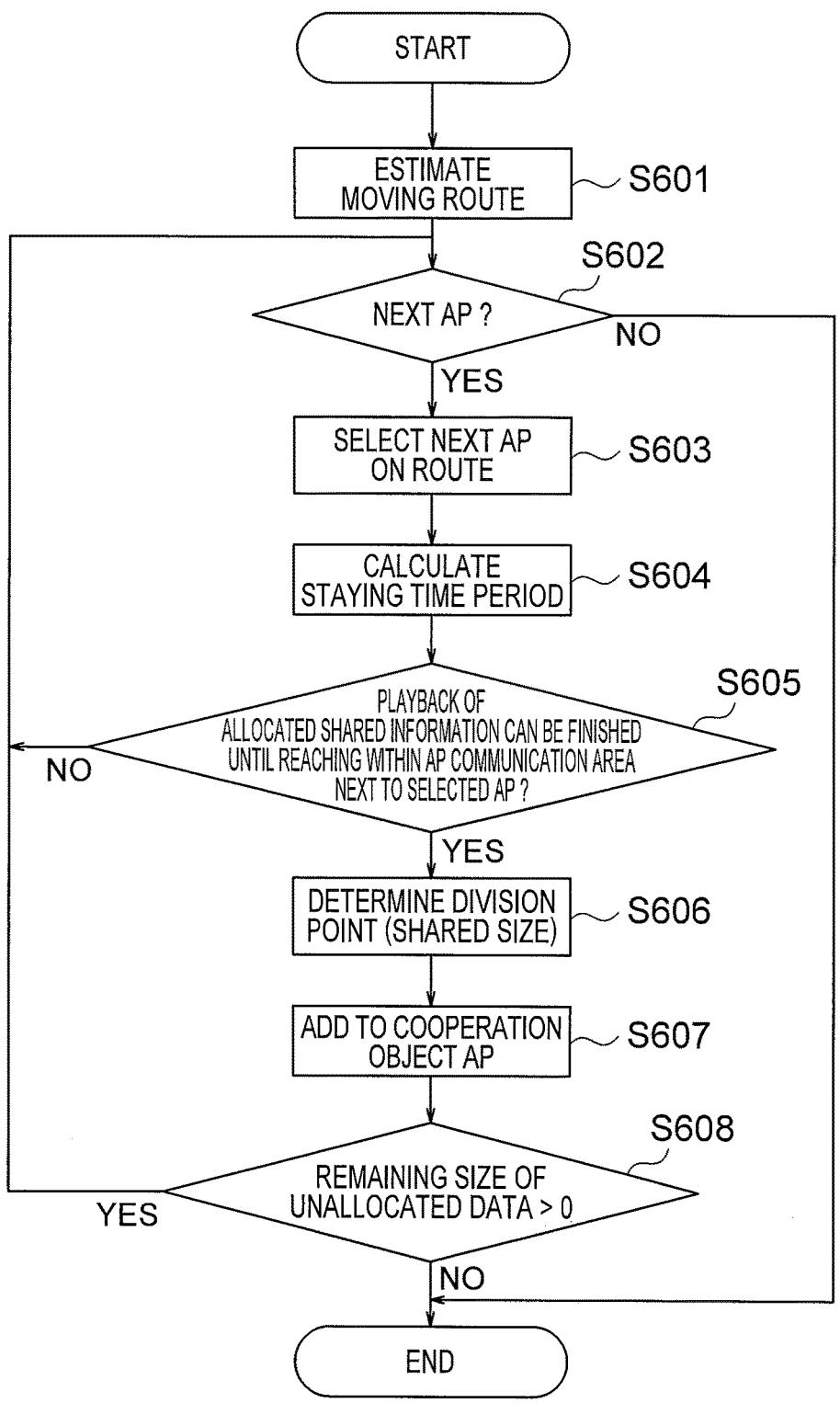
FIG. 12C is a flow chart showing a third example of the determination processing of how to divide object information.

FIG. 12C is a flow chart showing a third example of the determination processing of how to divide object information. FIG. 12C is an example of the case, as in FIG. 6D, of performing the division taking into consideration the moving speed of the wireless terminal 101, staying time periods for which the wireless terminal 101 stays in each of communication areas, the playback time period of a content.

(Step S601) First, the controller 207 estimates the moving route of the wireless terminal 101.

At this point, the controller 207 also acquires the moving speed of the wireless terminal 101.

(Step S602) Next, the controller 207 decides whether or not there is the next access point having a wireless communication range on the estimated moving route. If there is no next access point, the controller 207 finishes the determination processing of how to divide object information.

(Step S603) If it is decided in step S602 that there is the next access point, the controller 207 selects the next access point having a wireless communication range on the moving route.

(Step S604) Next, the controller 207 determines a staying time period for which the wireless terminal 101 stays within the communication area of the object access point selected in step S603.

(Step S605) Next, the controller 207 decides whether or not the playback of the allocated shared information can be completed with the wireless terminal 101 until the wireless terminal 101 reaches within the communication area of an access point next to the object access point selected in step S603. Here, the next access point also has a wireless communication range on the moving route. If the playback of the allocated shared information cannot be finished with the wireless terminal 101, the processing returns to step S602, and the processing following step S602 is repeated.

(Step S606) If it is decided in step S605 that the playback of the allocated shared information can be finished with the wireless terminal 101, the controller 207 determines the amount of data of shared information (shared size) to be transmitted to the object access point selected in step S603 using the moving speed of the wireless terminal 101 and the staying time periods determined in step S504, and determines the next division point at which the object information is divided.

(Step S607) Next, the controller 207 adds the object access point selected in step S603 to cooperation object access points.

(Step S608) Next, the controller 207 decides whether or not a remaining size of data that is unallocated out of the object information is larger than zero. If the remaining size of the unallocated data is larger than zero, the processing returns to step S602, and the processing following step S602 is repeated. In contrast, if the remaining size of the unallocated data is zero, the controller 207 finishes the determination processing of how to divide object information.

As described above, the access point AP in the first embodiment is a relay device that relays a signal between the first network and the second network. The communicator 204 wirelessly communicates with the wireless terminal 101 over the first network and communicates with the other relay devices over the first network or the second network. The detector 203 detects a communication request transmitted by the wireless terminal 101. The controller 207 decides whether or not the transmission of object information that is requested using the communication request to the wireless terminal 101 can be completed with the access point AP, and if the result of the decision indicates that the transmission cannot be completed, the controller 207 causes the communicator 204 to transmit to the other relay device a request signal to request to allocate a part or the whole of the object information in a storage area that the other relay device can access.

This causes the other access point to allocate the part or the whole of the object information, which allows the other access point to read out the part or the whole of the object information from the temporary storage 208 and transmit it to the wireless terminal 101 without reading out the part or the whole of the object information from the server 102. Therefore, even if the wireless terminal 101 cannot completely acquire the object information within a communication area provided by an access point AP, the wireless terminal 101 can acquire the remaining object information from the other access point for a relatively short time. In such a manner, it is possible to shorten a time that a moving wireless terminal takes for the downloading. In addition, by shortening a communication duration, it is possible to reduce consumed energy of the wireless terminal 101. The access point AP in the present embodiment is especially useful in the case where object information is so large that it cannot be acquired within a communication area provided by a single access point.

Although the series of descriptions have been made for one piece of object information, the descriptions can be also applied to a plurality of pieces of information. In the case, in particular, of consecutively transmitting a plurality of acquisition requests, pieces of shared information in accordance with these responses are properly stored in the access points. The order of storing may be determined in accordance with the order of the requests, or may be determined taking the above-described staying time period into consideration.

Figure 13:
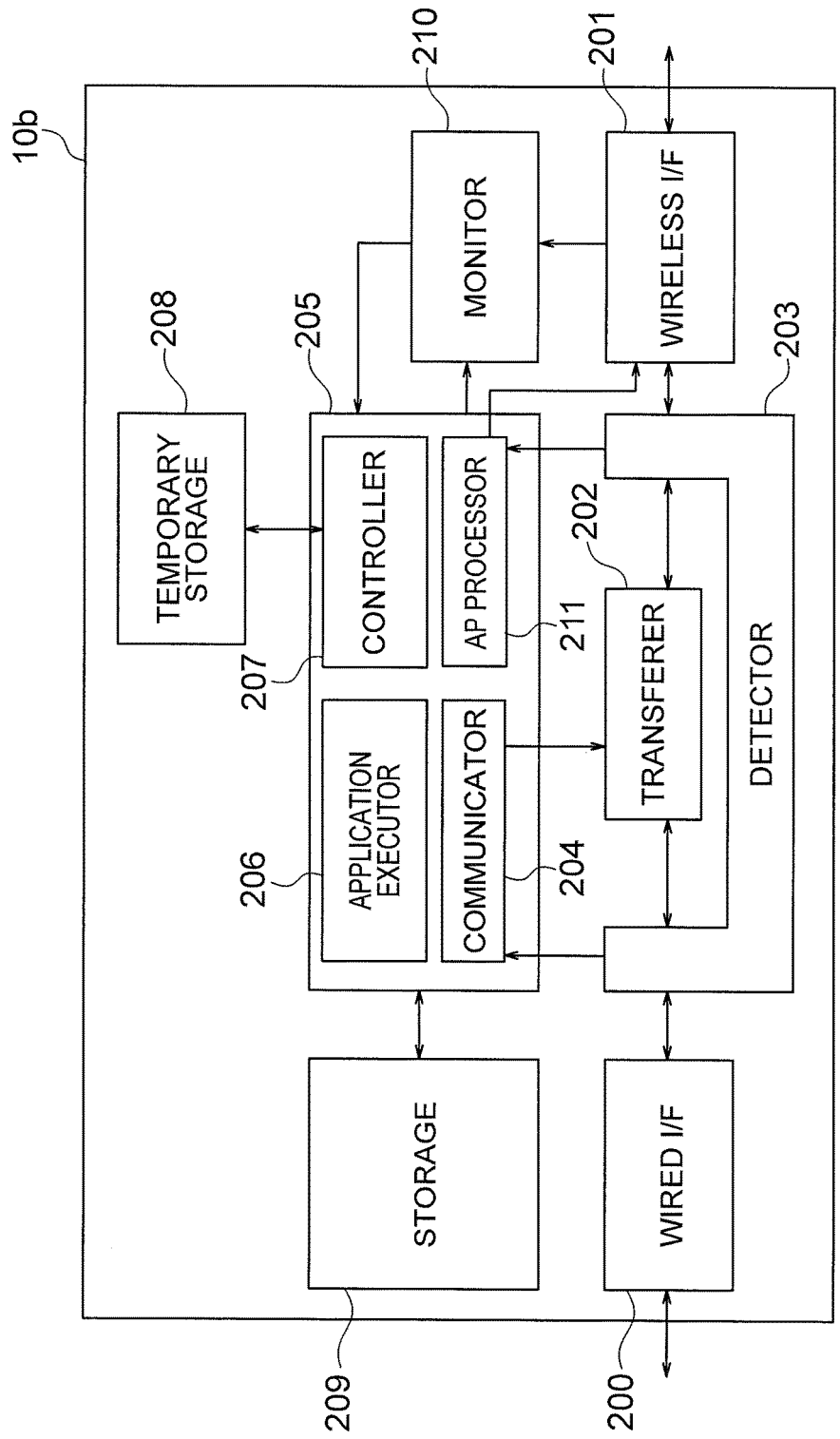
FIG. 13 is a diagram showing the configuration of an access point AP in a first modification of the first embodiment.
Figure 14:
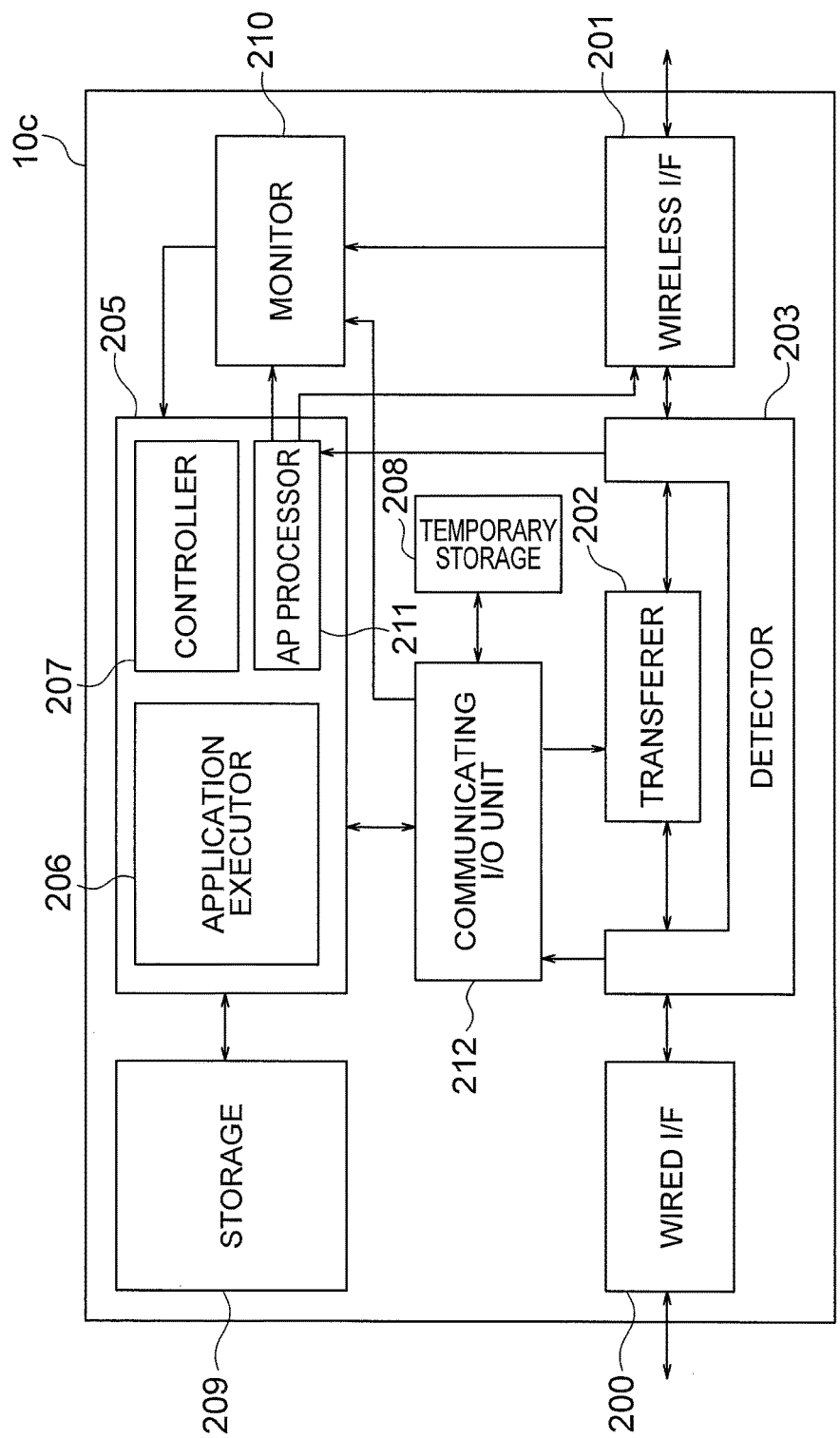
FIG. 14 is a diagram showing the configuration of an access point AP in a second modification of the first embodiment.

Note that the configuration of the access point AP in the first embodiment is not limited to the configuration shown in FIG. 2, but may be a configuration shown in FIG. 13 or FIG. 14. FIG. 13 is a diagram showing the configuration of an access point AP in a first modification of the first embodiment. Note that components common to those in FIG. 2 are denoted by the same reference numerals, and will not be described specifically. The configuration of the access point AP in the first modification of the first embodiment implements the communicator 204 in FIG. 1 using software. As shown in FIG. 13, the processor 205 includes the communicator 204, and the processor 205 executes a program to function also as the communicator 204.

FIG. 14 is a diagram showing the configuration of an access point AP in a second modification of the first embodiment. Note that components common to those in FIG. 2 are denoted by the same reference numerals, and will not be described specifically. The configuration of the access point AP in the second modification of the first embodiment is a configuration that is changed in such a manner, as compared with the configuration of the access point AP in FIG. 2, that the communicator 204 is changed to a communicating I/O unit 212, and the temporary storage 208 is connected to the communicating I/O unit 212. The communicating I/O unit 212 is an independent component into which input/output processing to the temporary storage 208 in FIG. 2 is integrated with the communicator 204.

Second Embodiment

Next, a second embodiment will be described. The processing in the first embodiment relating to the division and sharing of object information may have a computational complexity that is too high to implement in a single access point. Thus, the second embodiment introduces a controller (controlling device) 300 that integrates and manages a series of the computing functions.

Figure 15:
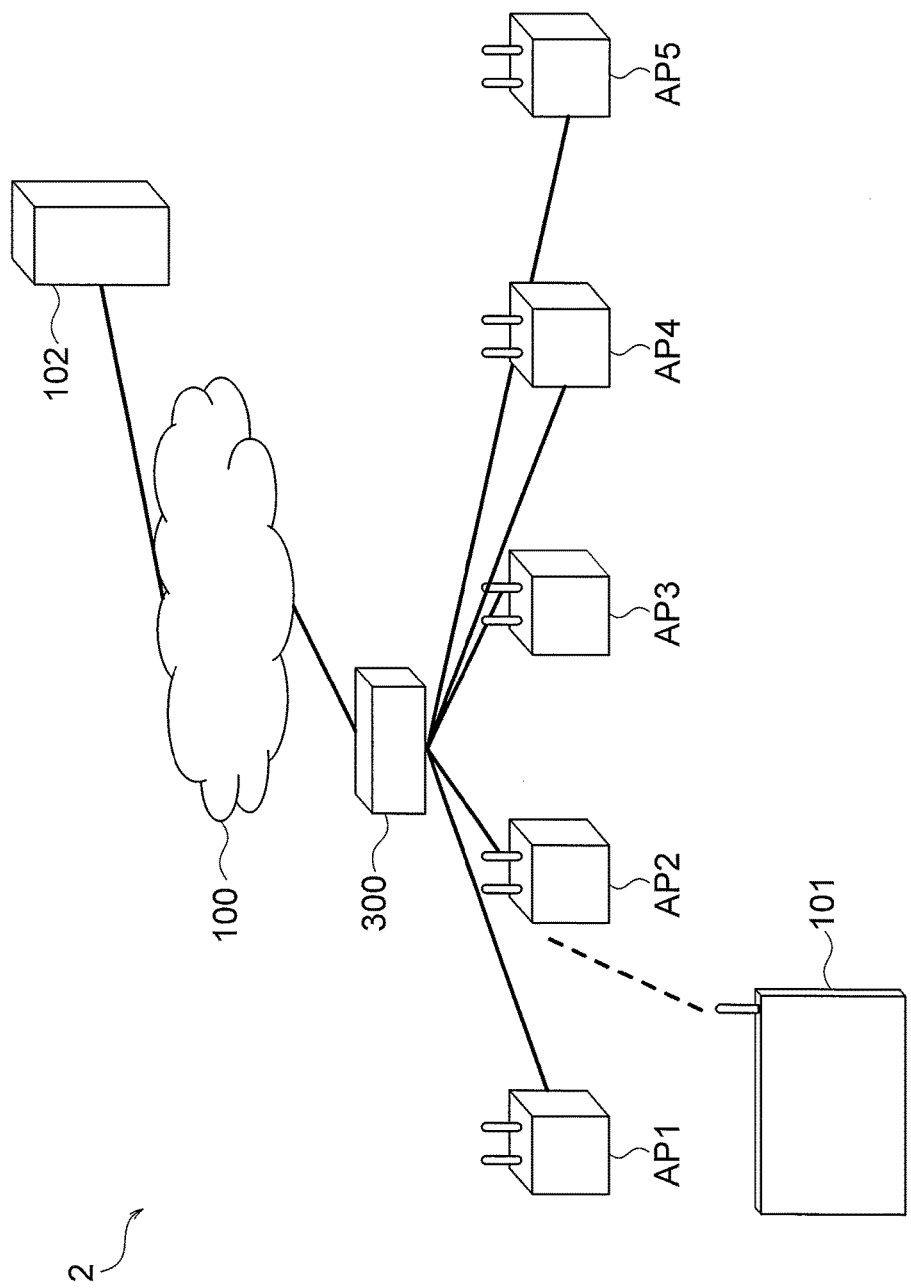
FIG. 15 is a diagram showing the configuration of a communication system 2 in a second embodiment.

FIG. 15 is a diagram showing the configuration of a communication system 2 in the second embodiment. Note that components common to those in FIG. 1 are denoted by the same reference numerals, and will not be described specifically. In the configuration of the communication system 2 in the second embodiment, as compared with the configuration of the communication system 1 in the first embodiment in FIG. 1, the controller 300 is added. The controller 300 is connected to the access points AP1 to AP5 in a wired manner and connected to the network 100 in a wired manner. This enables the controller 300 to communicate with the access points AP1 to AP5 and communicate with a server 102 over the network 100.

The access point AP includes the components described in FIG. 2, while the communicator 204 transmits the communication status information acquired by a monitor 210 also to the controller 300.

In addition, the comprehension processing of the moving status of the wireless terminal 101 performed by the controller 207 and the division processing of object information in the first embodiment are implemented in the controller 300. The controllers 207 of the access points AP1 to AP5 receive instructions from the controller 300 and perform only sharing object information with the other access points based on the instructions.

Figure 16:
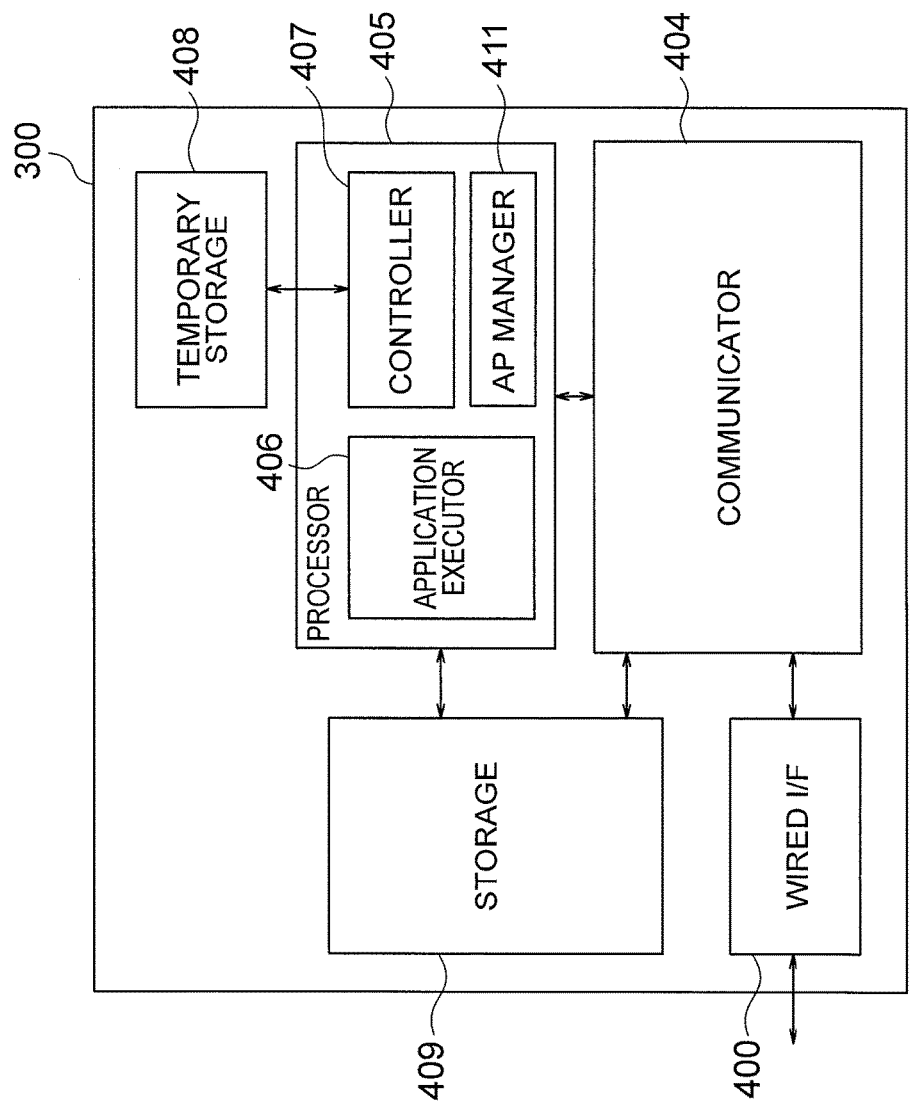
FIG. 16 is a diagram showing the configuration of a controller 300 in the second embodiment.

FIG. 16 is a diagram showing the configuration of the controller 300 in the second embodiment. As shown in FIG. 16, the controller 300 includes a wired I/F 400, a communicator 404, a processor 405, a temporary storage 408, and a storage 409.

The wired I/F 400, a communicator 404 and a processor 405 can be implemented by circuitry such as a processor or an integrated circuit. Each circuitry which implements the wired I/F 400, a communicator 404 and a processor 405 may be different physical circuitry, or all or a part of them may be same physical circuitry.

The wired I/F 400 is an interface used for connection to the network 100 and the access points AP1 to AP5 in a wired manner.

The communicator 404 communicates with the access points AP1 to AP5 and the server 102. For example, the communicator 404 receives from an access point APi object information that is requested using a communication request or metadata on the object information transmitted by the wireless terminal 101, and communication status information that represents the status of the communication channel and/or communication of the access point APi.

The processor 405 includes an application executor 406, a controller 407, and an AP manager 411. In the present embodiment, these components are described as individual components, but may be software that is executed on the processor 205.

The application executor 406 is, for example, an OS that manages the operation of the access point AP and executes an application running on the access point AP. In addition, the application executor 406 has an information acquisition proxy function as with the application executor 206 of the access point in the first embodiment.

The AP manager 411 has a function of managing the access point and a function of authenticating a terminal and a user.

The controller 407 controls the temporary storage 408. In addition, the controller 407 determines the volume of shared information being a part or the whole of object information and/or a relay device being a transmitting destination using the object information or this metadata, and the communication status information.

The temporary storage 408 temporarily caches information exchanged via the controller 300.

The storage 409 saves information used by the communicator 404 and the processor 405.

Figure 17:
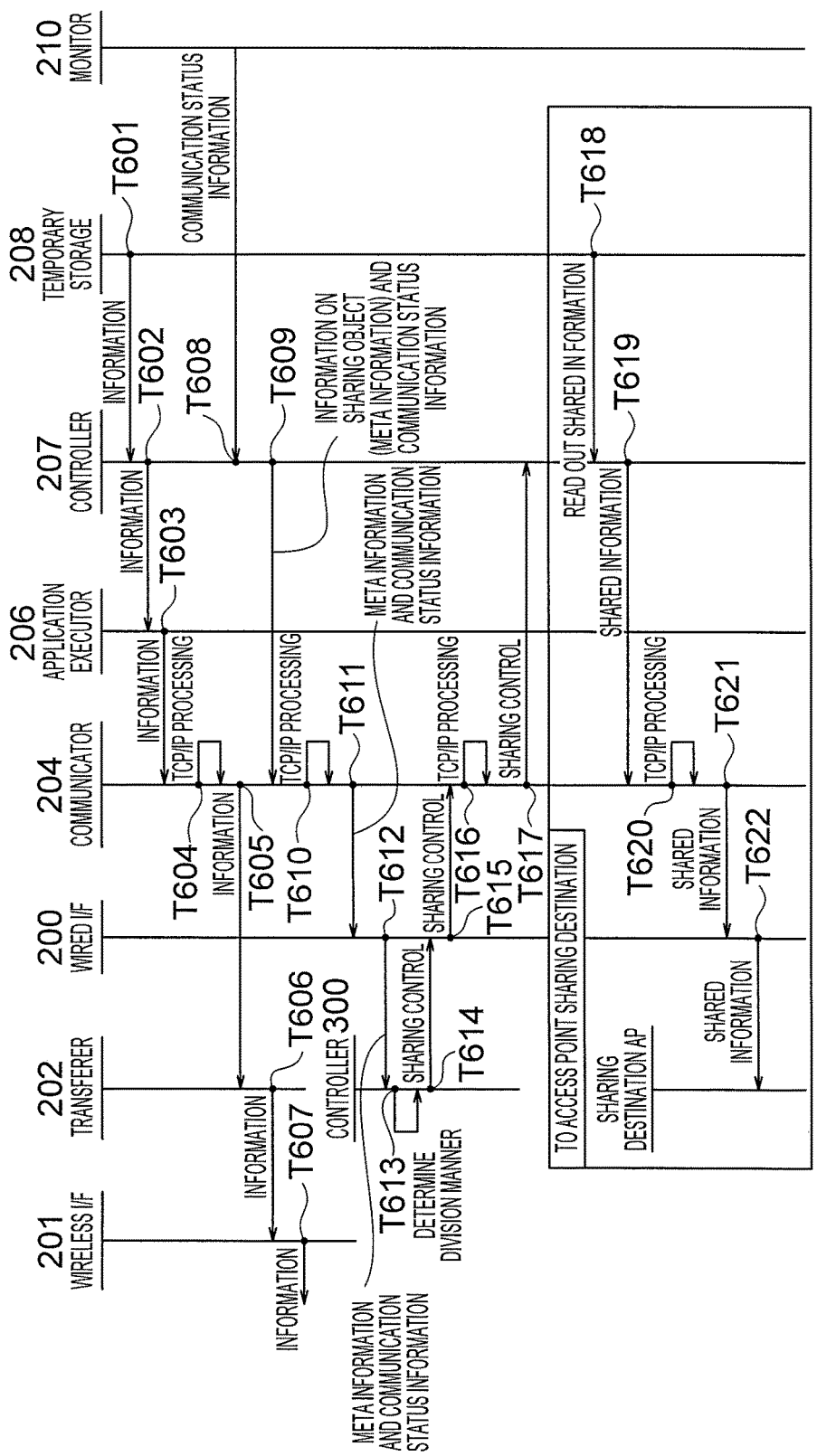
FIG. 17 is a sequence diagram showing an example of the flow of shared information distribution processing in the second embodiment.

FIG. 17 is a sequence diagram showing an example of the flow of shared information distribution processing in the second embodiment. In FIG. 17, the distributing destination and the size of shared information are determined by the controller 300, and the shared information is actually transmitted by the controller 207 of the access point AP1.

As with T231 to T237 in FIG. 5, in T601 to T607, a part of object information that is stored in the temporary storage 208 of the access point AP1 is transmitted to the wireless terminal 101 through wireless communication.

(T608) Next, the controller 207 of the access point AP1 acquires communication status information from the monitor 210.

(T609 to T612) Next, the controller 207 transmits meta information on the object information to be a sharing object (e.g., information on the identifier and the size thereof) and the communication status information to the controller 300 via the communicator 204 and the wired I/F 200. In such a manner, the object information itself is not transmitted to the controller 300 but the information on the identifier and the size thereof is transmitted to the controller 300.

(T613) Next, the controller 407 of the controller 300 receiving the meta information on the object information determines whether the object information needs to be divided. Here, it is assumed that the division is determined to be needed. Then, the controller 407 of the controller 300 determines distributing destinations of pieces of shared information obtained by dividing the object information, and the sizes of the pieces of shared information.

(T614) Next, the controller 407 of the controller 300 transmits to the access point AP1 sharing control information that contains the distributing destinations of the pieces of shared information and the sizes of the pieces of shared information.

(T615 to T617) The sharing control information transmitted from the controller 300 is received by the wired I/F 200 and subjected to TCP/IP processing by the communicator 204 before being transmitted to the controller 207.

(T618 to T622) The controller 207 of the access point AP1 reads out from the temporary storage 208 a piece of shared information for an sharing destination access point to be an object using the sharing control information and transmits the read-out shared information to the sharing destination access point via the communicator 204 and the wired I/F 200. The controller 207 of the access point AP1 repeats a series of these processes in T618 to T622 for the sharing destination access points (here, for each of the access points AP2 to AP5).

Note that, in contrast to this, information sharing may be performed using the controller 300 as a starting point. That case includes two further methods. One such method is that the access point AP1 notifies the controller 300 of object information, and the controller 300 divides and transmits the object information (refer to FIG. 18A and FIG. 18B). Another method is that the controller 300 holds object information in the temporary storage 408 thereof, and the controller 300 divides and transmits the object information (refer to FIG. 19A and FIG. 19B).

The processing of the former method will be described with reference to FIG. 18A and FIG. 18B.

Figure 18A:
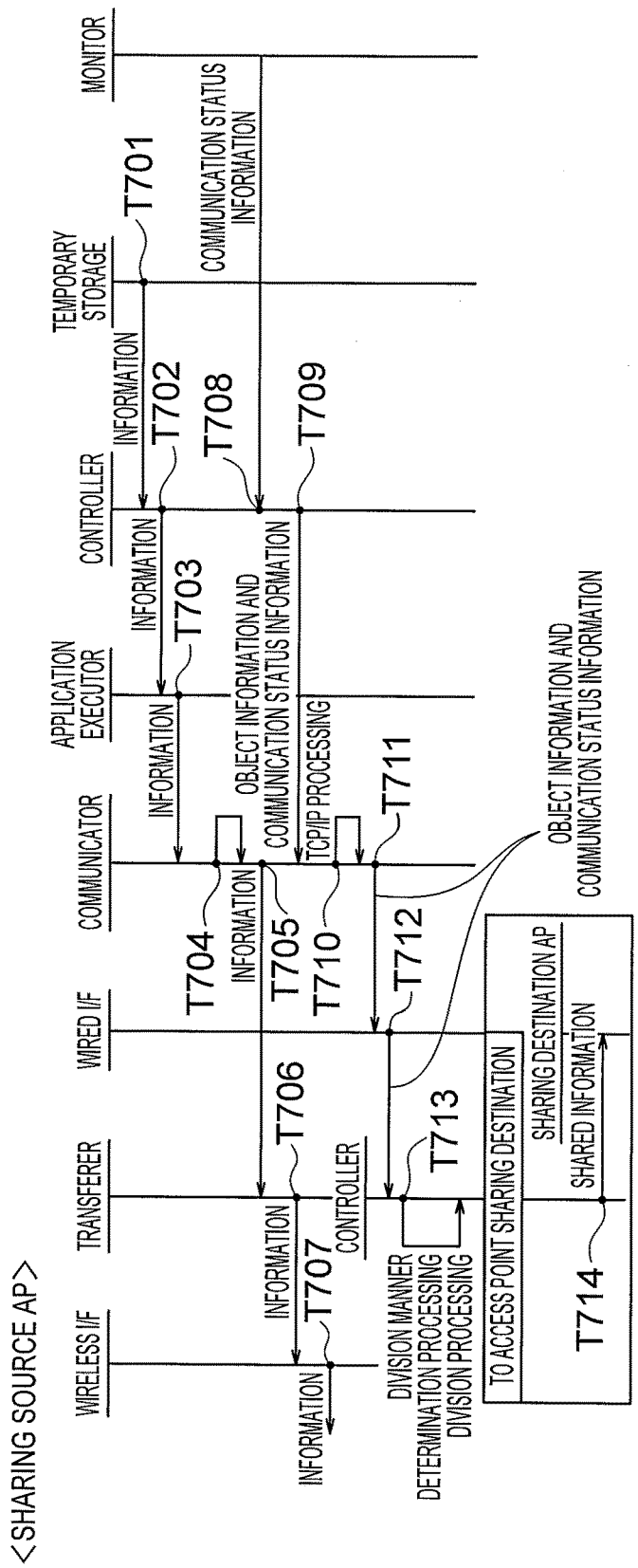
FIG. 18A is a sequence diagram showing a second example of the shared information distribution processing in the second embodiment.

FIG. 18A is a sequence diagram showing a second example of the shared information distribution processing in the second embodiment. Here the following description will be made assuming, as an example, that a sharing source access point is the access point AP1.

As with T231 to T237 in FIG. 5, in T701 to T707, a part of object information stored in the temporary storage 208 of the access point is transmitted to the wireless terminal 101 through wireless communication.

(T708) Next, the controller 207 of the access point AP1 acquires communication status information from the monitor 210.

(T709 to T712) Next, the controller 207 transmits the object information to be a sharing object and the communication status information to the controller 300 via the communicator 204 and the wired I/F 200.

(T713) Next, the controller 407 of the controller 300 receiving the object information determines whether the object information needs to be divided. Here, it is assumed that the division is determined to be needed. Then, the controller 407 of the controller 300 determines distributing destinations of pieces of shared information obtained by dividing the object information, and the sizes of the pieces of shared information.

(T714) Next, the controller 407 of the controller 300 transmits a piece of shared information for a sharing destination access point to be an object to the sharing destination access point. The controller 407 of the controller 300 repeats this processing for each of the sharing destination access points.

Figure 18B:
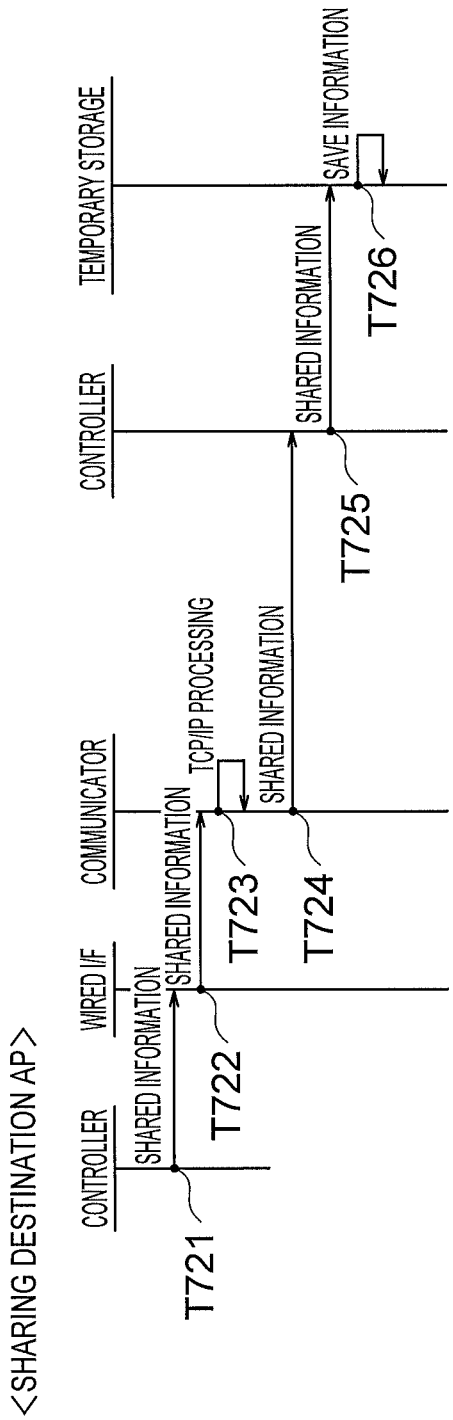
FIG. 18B is a sequence diagram showing in detail the process of T714 in FIG. 18A.

FIG. 18B is a sequence diagram showing in detail the process of T714 in FIG. 18A.

(T721) The controller 407 of the controller 300 transmits the piece of shared information for the access point sharing destination to be an object to the access point sharing destination.

(T722 to T725) In the sharing destination access point, this shared information is received by the wired I/F 200, carried out to TCP/IP processing by the communicator 204, and transferred to the controller 207.

(T726) The controller 207 saves the transferred shared information in the temporary storage 208.

Next, there will be described the method in which the controller 300 holds object information in the temporary storage 408 thereof, and the controller 300 divides and transmits the object information, with reference to FIG. 19A and FIG. 19B.

Figure 19A:
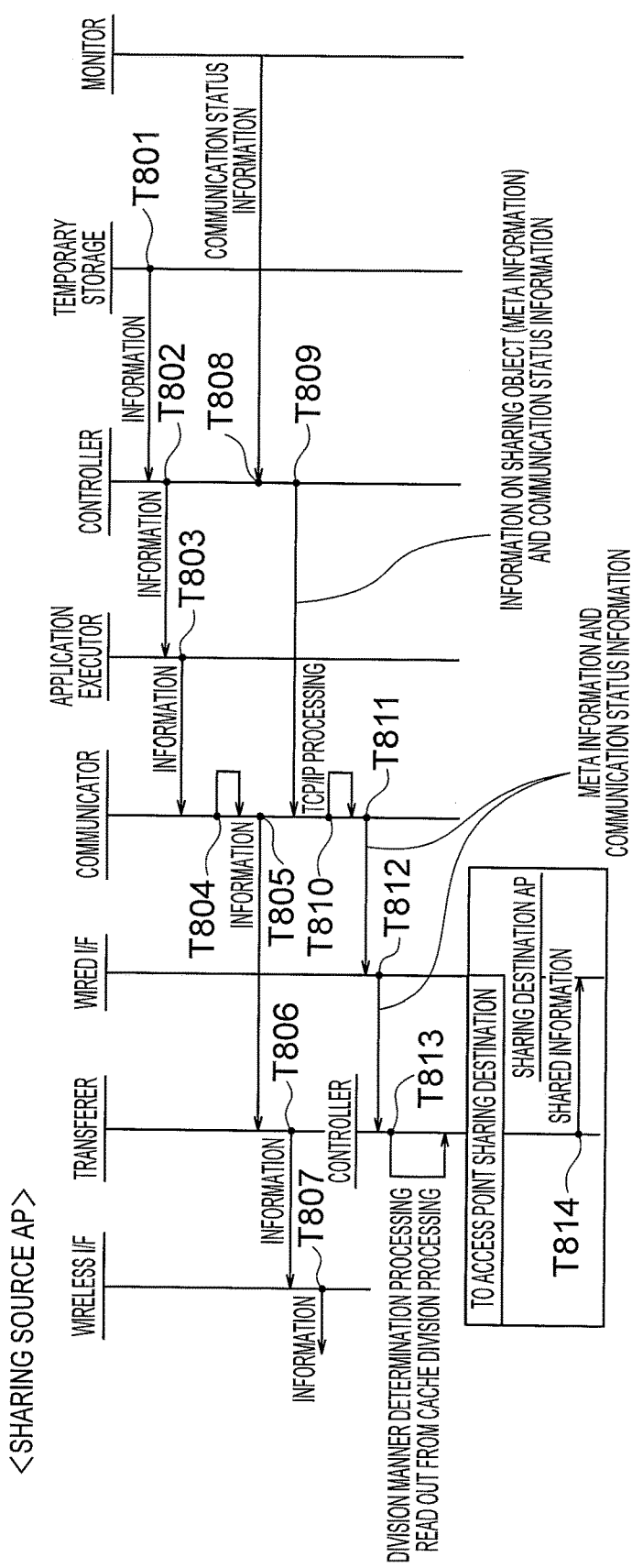
FIG. 19A is a sequence diagram showing a third example of the shared information distribution processing in the second embodiment.

FIG. 19A is a sequence diagram showing a third example of the shared information distribution processing in the second embodiment. Here, the following description will be made assuming, as an example, that a sharing source access point is the access point AP1.

As with T231 to T237 in FIG. 5, in T801 to T807, a part of object information stored in the temporary storage 208 of the access point is transmitted to the wireless terminal 101 through wireless communication.

(T808) Next, the controller 207 of the access point AP1 acquires communication status information from the monitor 210.

(T809 to T812) Next, the controller 207 transmits object information to be a sharing object and the communication status information to the controller 300 via the communicator 204 and the wired I/F 200.

(T813) Next, the controller 407 of the controller 300 receiving the object information determines whether the object information needs to be divided. Here, it is assumed that the division is determined to be needed. Then, the controller 407 of the controller 300 determines distributing destinations of pieces of shared information obtained by dividing the object information, and the sizes of the pieces of shared information. Then, the controller 407 of the controller 300 reads out the object information from the temporary storage 408 and divides the read-out object information in accordance with the sizes of the pieces of shared information. The piece of shared information is thereby generated for each sharing destination access point.

(T814) Next, the controller 407 of the controller 300 transmits a piece of shared information for a sharing destination access point to be an object to the sharing destination access point. The controller 407 of the controller 300 repeats this processing for the sharing destination access points.

Figure 19B:
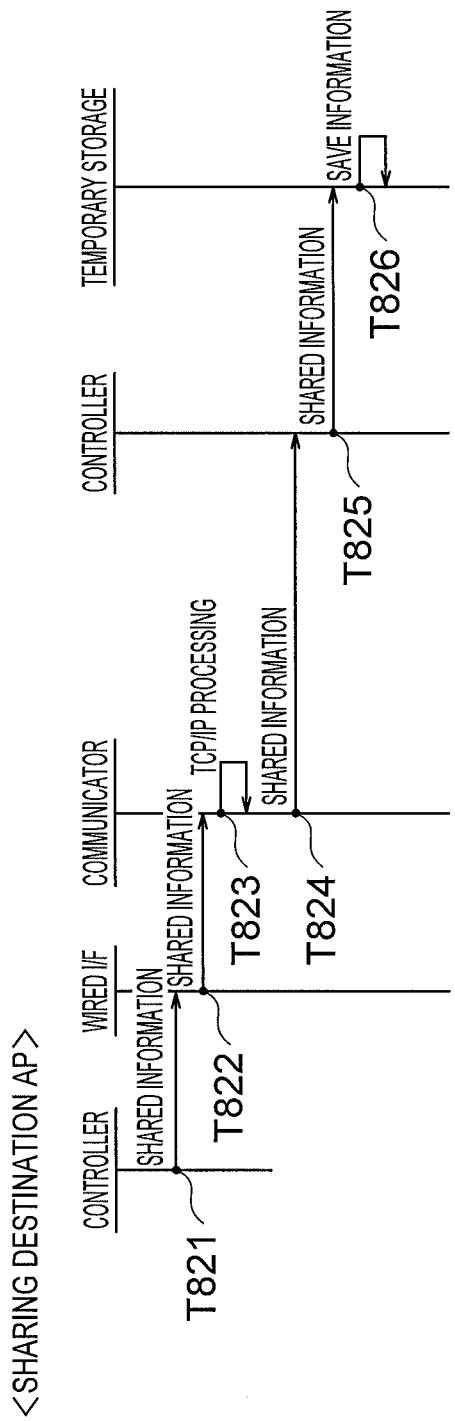
FIG. 19B is a sequence diagram showing in detail the process of T814 in FIG. 19A.

FIG. 19B is a sequence diagram showing in detail the process of T814 in FIG. 19A. The processes of T821 to T826 in FIG. 19B are similar to the processes of T721 to T726 in FIG. 18B and will not be described specifically.

Although the sequence diagrams of FIG. 17 to FIG. 19 do not show advance confirmation processing as to whether a part of shared information is saved in a sharing destination access point, which has been described in the first embodiment, but may be added. In addition, the process in which each access point notifies the controller 300 of communication status information may be periodically performed by each access point, or may be performed when a request is received from the controller 300.

As described above, the communication system in the second embodiment includes the access points AP and the controller 300 communicating with the access points AP. The communicator 404 of the controller 300 receives from an access point AP object information that is requested using a communication request transmitted by the wireless terminal 101 or metadata on the object information, and communication status information that represents the status of the communication channel and/or communication of a relay device. Then, the controller 407 determines the volume of shared information being a part or the whole of the object information and/or an access point being a transmitting destination using this object information or this metadata, and the communication status information.

The controller 300 thereby determines the volume of the shared information and/or the access point being a transmitting destination, and thus processing loads on an access point AP can be reduced as compared with the first embodiment. For this reason, even a processor that does not have a very large computing capacity can form an access point AP, which can reduce the cost of the access point AP. In addition, by concentrating processing that needs to get a perspective of the whole system, such as comprehending the moving status of the wireless terminal 101, on the controller 300 side, it is possible to make use of more information, which allows an enhanced precision of determination to be expected.

Figure 20:
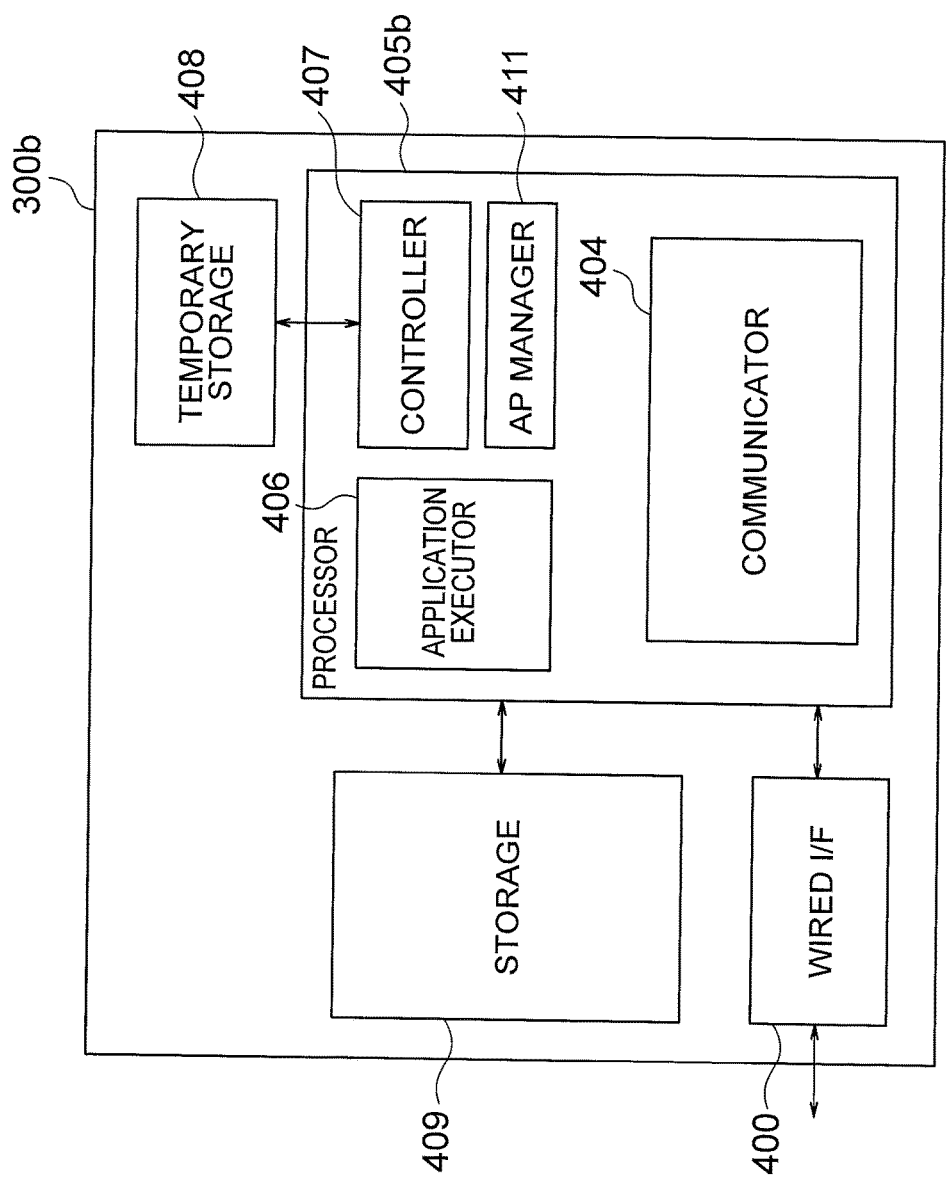
FIG. 20 is a diagram showing the configuration of a controller 300*b* in a first modification of the second embodiment.

Note that the configuration of the controller 300 in the second embodiment is not limited to the configuration shown in FIG. 16. FIG. 20 is a diagram showing the configuration of a controller 300b in a first modification of the second embodiment. Note that components common to those in FIG. 16 are denoted by the same reference numerals, and will not be described specifically. The configuration of the controller 300b in the first modification of the second embodiment allows the communicator 404, which is an individual component in FIG. 16, to be implemented by software. As shown in FIG. 20, a processor 405b includes the communicator 404, and the processor 405b executes a program to function also as the communicator 404.

Figure 21:
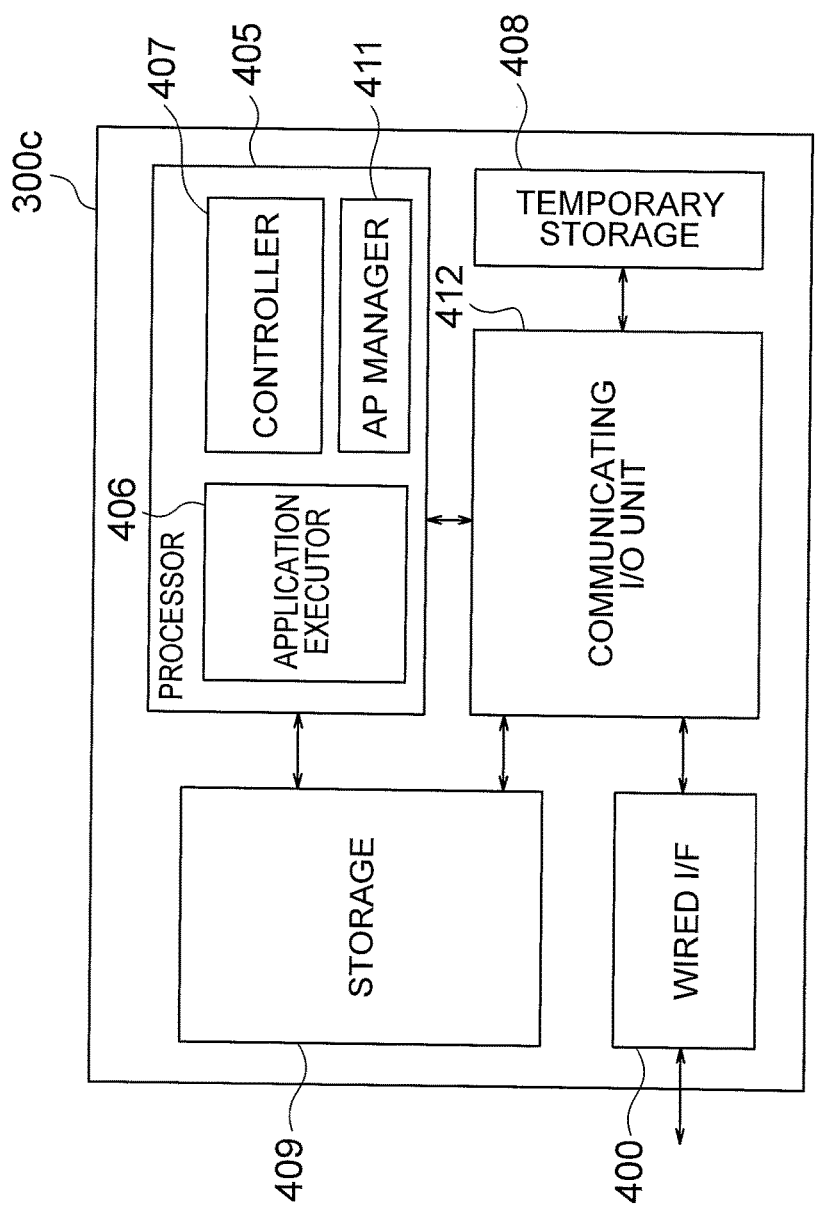
FIG. 21 is a diagram showing the configuration of a controller 300*c* in a second modification of the second embodiment.

FIG. 21 is a diagram showing the configuration of a controller 300c in a second modification of the second embodiment. Note that components common to those in FIG. 16 are denoted by the same reference numerals, and will not be described specifically. In the configuration of the controller 300c in the second modification shown in FIG. 21, as compared with the controller 300 in FIG. 16, the communicator 404 is changed to a communicating I/O unit 412, the temporary storage 408 is connected to the communicating I/O unit 412. FIG. 16 shows that the temporary storage 408 is connected to the processor 405 and operates under instructions from the controller 407. In contrast, FIG. 21 shows that the communicating I/O unit 412 is made by extracting an I/O function with the temporary storage 408 from the controller 407 in FIG. 16 and integrating it with the communicator 404 in FIG. 16.

Third Embodiment

Next, a third embodiment will be described. The above-described embodiments have been described about the processing of acquiring information (download processing). The present embodiment will be described about processing of transmitting information (upload processing). An access point AP implementing the present embodiment is shown in the same functional block diagram as that in the first embodiment although the function of the controller is changed to be able to support the upload processing.

Figure 22:
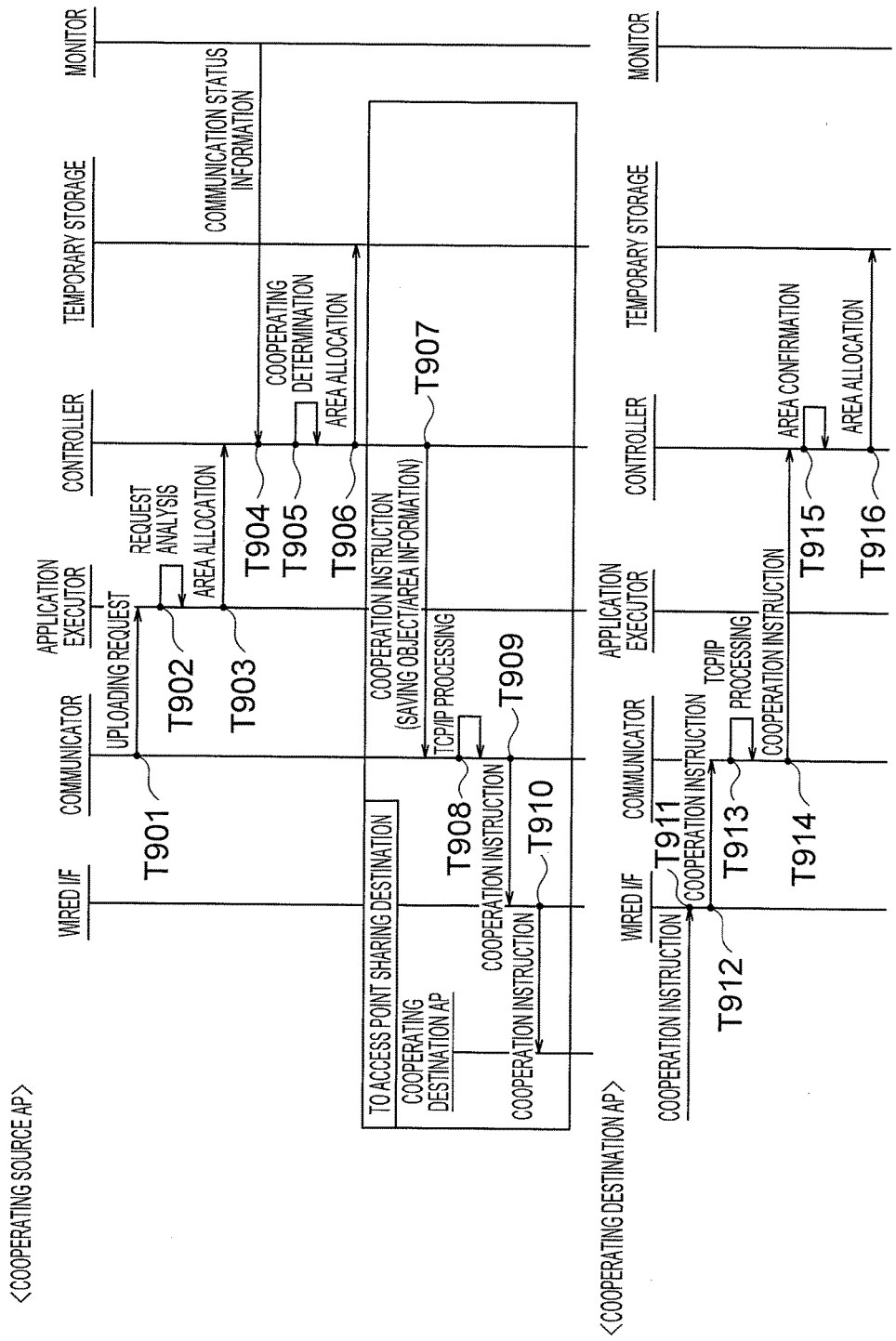
FIG. 22 is a sequence diagram showing an example of upload cooperation processing in a third embodiment.

Next, the processing by the access point AP in the present embodiment will be described with reference to FIG. 22. FIG. 22 is a sequence diagram showing an example of upload cooperation processing in the third embodiment. To describe this sequence diagram, it is assumed that a request from the wireless terminal 101 is detected by an access point as in the first embodiment, and communication is established with the application executor 206 of the access point AP That is, it is assumed that information transmitted by the wireless terminal 101 is once received and processed by the application executor 206 and is ready to be saved in the temporary storage 208. Note that the application processor 206 processes the information saved in the temporary storage 208 at an appropriate timing and thereafter retransmits the information to an original communication destination. This will be described hereafter.

In FIG. 22, the description will be made assuming, as an example, that the access point AP1 is determined as a cooperating source access point, and the access points AP2 to AP5 are determined as cooperating destination access points. The access point AP1 performs the processes of T901 to T910 as follows.

(T901) First, the communicator 204 receiving an uploading request from the wireless terminal 101 transfers the uploading request to the application executor 206.

(T902) Next, the application executor 206 analyzes the received uploading request and acquires meta information contained in the uploading request. Here, the uploading request uses, for example, an HTTP POST message and thus contains meta information such as a URL being an upload destination, the identifier of object information (e.g., file name) to be an object of the uploading request, and the volume of the object information.

(T903) Next, the application executor 206 instructs the controller to allocate an area (area to temporarily save information to be uploaded) based on the meta information.

(T904) Next, the controller 207 acquires communication status information from the monitor 210.

(T905) Next, the controller 207 determines whether or not the object information can complete uploading through communication within the communication area of the access point AP1, using the communication status information and the volume of the object information. Here, the case where the upload processing cannot be completed means, for example, the case where the volume of the object information exceeds a maximum transmittable volume, the case where a radio wave condition is such poor that an appropriate communication cannot be expected, and the like. Here, the maximum volume is a value obtained by multiplying an assumed link rate and an assumed staying time period.

Here, if the upload of the object information can be completed through communication within the communication area of the access point AP1, which means cooperation is not needed, and thus the controller 207 allocates an area having the volume of object information in the temporary storage 208 and saves pieces of information uploaded from the wireless terminal 101 one by one.

In contrast, if the upload of the object information cannot be completed through communication within the communication area of the access point AP1, which means cooperation is needed, the controller 207 performs area allocation processing on the temporary storage 208 thereof and thereafter instructs access points to be cooperation objects to provide cooperation. Here, it is assumed, as an example, that it is decided that the upload of the object information cannot be completed through communication within the communication area of the access point AP1.

(T906) The controller 207 allocates an area in the temporary storage 208 thereof.

(T907 to T910) Next, the controller 207 transmits a cooperation instruction to the access points to be cooperation objects, the cooperation instruction being a request signal to request to allocate a storage area in which a part or the whole of the object information is stored. Here, the cooperation instruction contains the identifier of the object information to be uploaded (saving object in FIG. 22) and the size of the storage area requested to be allocated (area information on FIG. 22). This cooperation instruction generated by the controller 207 is formatted into a TCP/IP packet by the communicator 204 and transmitted to the access points via the wired I/F 200.

(T911 to T916) Next, in the access points AP2 to AP5 being cooperating destinations, when the cooperation instruction is received via the wired I/F 200 and the communicator 204, the controller 207 analyzes the details of the cooperation instruction, associates the notified identifier and size, and allocates an area having the notified size in the temporary storage 208.

At this point, if the area having the notified size cannot be allocated in the temporary storage 208, the controller 207 may identify an unnecessary area based on a predetermined degree of priority and allocate the instructed area by releasing the identified area. Note that if a newly received cooperation instruction is found to have the lowest degree of priority as a result of comparison with a predetermined degree of priority, the controller 207 may transmit, in response to this cooperating request, a refusal signal to refuse this cooperating request.

In such a manner, when the communicator 204 receives a request signal to request the access point to relay a part or the whole of object information on behalf of the other access point, from the other access point, the controller 207 allocates an area having a size specified by the request signal in the temporary storage 208 if an accessible free space in the temporary storage 208 is larger than or equal to this size.

Note that processing similar to this determination relating to securing an area is also performed at the time of determination of securing an area in the cooperating source access point AP1.

Note that while acquiring communication status information obtained by the monitor 210 through monitoring as first communication status information, the controller 207 may acquire second communication status information representing the statuses of the communication channels and/or communication of the other relay devices from the other relay devices. Then, the controller 207 may determine the volumes of storage areas requested to be allocated or determine the other relay devices to be transmitting destinations of the request signal, in accordance with at least one of the first communication status information and the second communication status information.

(Example of Information Uploaded to Access Points)

Figure 23:
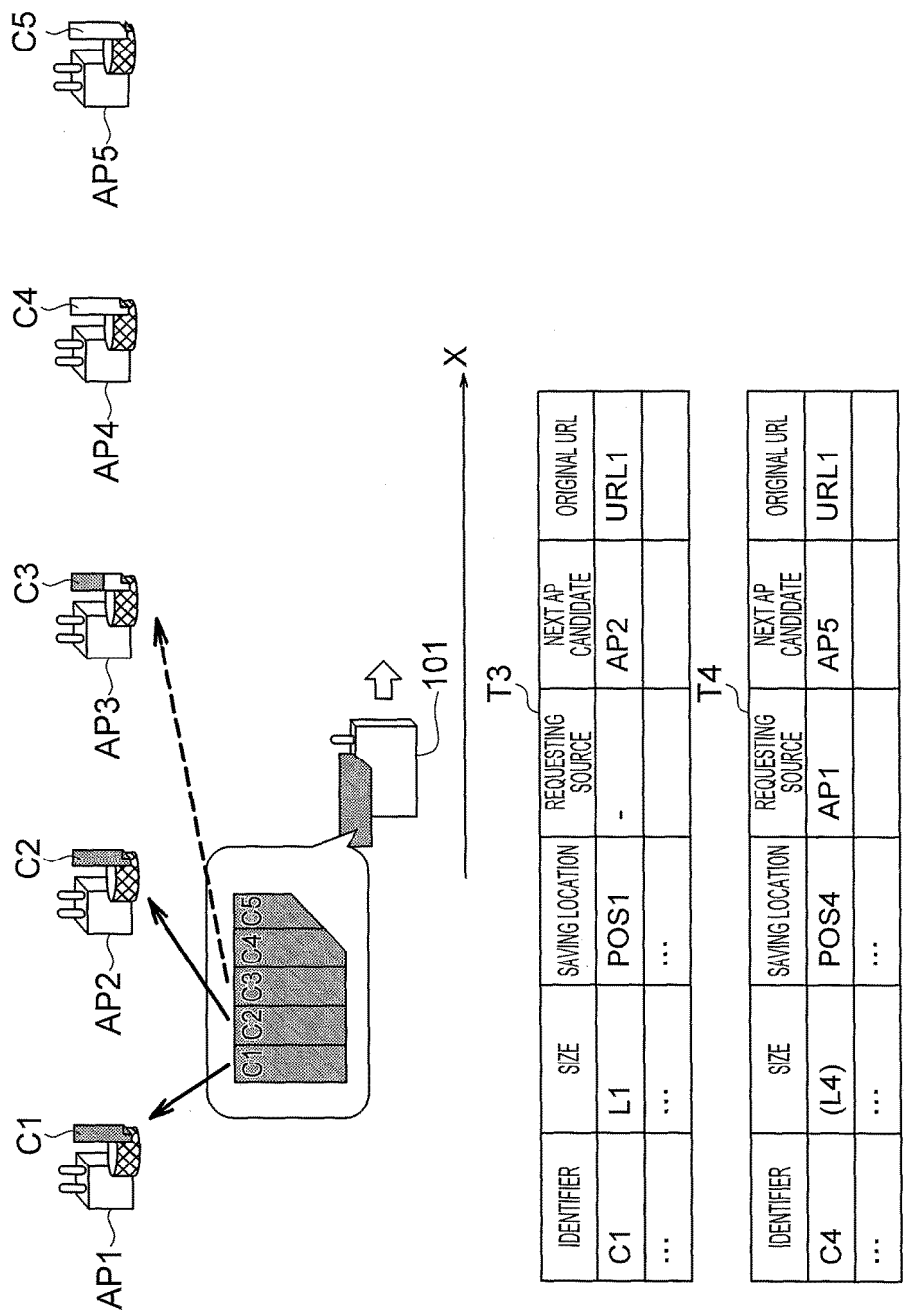
FIG. 23 is a schematic diagram showing how information uploaded from the wireless terminal 101 is saved in the temporary storages 208 of each access point.

Next, an example of information uploaded to the access points will be described with reference to FIG. 23. FIG. 23 is a schematic diagram showing how information uploaded from the wireless terminal 101 is saved in the temporary storage 208 of access points. The upper half of FIG. 23 shows how the wireless terminal 101 moving in an x-axis positive direction uploads pieces of information to a plurality of access points. Object information C is divided into fragmented information C1 to C5, where the fragmented information C1 and the fragmented information C2 have been uploaded, and the fragmented information C3 is being uploaded, and the fragmented information C4 and the fragmented information C5 are to be uploaded.

At this point, the access point AP1, the upload to which has been completed, manages information saved in the temporary storage 208 in a form shown in a table T3 in FIG. 23. Here, C1 is an identifier to identify the fragmented information C1, L1 is a size of the fragmented information C1 being one of fragments into which the object information is divided, and POS1 is a location in the temporary storage 208 at which the fragmented information C1 is stored.

For example, this information on location may be managed in the form of abstract information such as a file name, may be information based on a file system (e.g., inode number), or may be information based on a hardware structure being in a further lower level (e.g., cylinder/cluster number or block number). In any case, an identifier to identify fragmented information may only be associated with a saving location.

The column "next AP candidate" in the table T3 is to store an access point specified as the next cooperating destination through a series of cooperating operations. The specific method of using this value will be described hereafter. Note that if this value is not used, this information does not need to be held. The column "original URL" in the table T3 is to store a URL that the wireless terminal 101 specifies as an upload destination of the information C. The method of using this value will be described hereafter.

A table T4 in the drawing shows management information on AP4. The table T4 shows a state in which an area is allocated in the temporary storage 208 by showing "L4" in the item "size" in parentheses. Note that, on an actual computer, the state is marked by appropriate means such as setting a flag. In addition, the column "requesting source" in the table T4 is an identifier of an access point that has requested cooperation, and it is AP1, the identifier of the access point AP1, because the access point AP1 has requested the cooperation.

(Processing After Upload to Access Points)

Next, processing after upload to the access points will be described. Pieces of information uploaded to the access points are finally retransmitted to a URL specified by the wireless terminal 101. The processing will be described. There are two conceivable methods for this processing in general. A first method is one in which the access point AP1 having performed cooperating operation performs cooperation again and properly unites divided pieces of fragmented information to restore original object information, and thereafter transmits the information to the server 102 that is specified by an original URL issued by the wireless terminal 101. A second method is one in which the access point transmits pieces of fragmented information to the server 102 together with the identifiers of these pieces of fragmented information, and the server 102 unites them to restore original object information. Each method will be described hereafter.

First, there will be described the case where the access points cooperate again to unite information which is transmitted to the server 102. As a method of uniting information, one of the cooperating access points may serve as a representative node to collect the pieces of information from the other access points. In addition, as another method, the access points may detect some trigger and transfer the pieces of information to the representative node. As still another method, each access point may transfer piece of fragmented information held by each access point and information received from the previous access point to an access point indicated by the next AP candidate in order in a bucket brigade manner, using information on the next AP candidate contained in the above-described information that is managed by each access point. This causes, for example, the piece of fragmented information C1 to be transferred to the access point AP2, the pieces of fragmented information C1 and C2 to be transferred to the access point AP3, the pieces of fragmented information C1, C2, and C3 to be transferred to the access point AP4, and the pieces of fragmented information C1, C2, C3, and C4 to be transferred to the access point AP5. Then, in the access point AP5, original object information is restored from the collected pieces of fragmented information C1, C2, C3, C4, and C5.

When an access point to be a requesting source of the cooperation is used as the representative node, the access point being the requesting source adds the cooperating access points to the information in FIG. 23 to store the access points. After upload from a terminal is completed, the access point being the requesting source accesses the cooperating access points by means such as HTTP GET to collect pieces of fragmented information into which object information is fragmented. Thereafter, the access point being the requesting source unites the collected pieces of fragmented information into one piece and transmits the one piece information to the server 102.

There are some possible timings to perform this uniting processing, including, for example, one at which a load on an access point is reduced (e.g., when another communication is reduced), one at a certain amount of time, and the like. The same is true for the case of transferring to a representative access point upon the detection of some trigger, and the case of transferring in a bucket brigade manner. In that case, the transfer may be performed by establishing a TCP connection and using some communications protocol, for example, HTTP POST. In the case of transferring in a bucket brigade manner, each access point adds piece of fragmented information held by itself to piece of fragmented information notified from the previous access point and thereafter transfers the fragmented information to the subsequent access point.

Note that, methods of determining the representative node may include, in addition to one in which, as described above, an access point being a requesting source requesting the cooperation is determined, one in which the access points transmit a random number or information on the loads thereof to one other using broadcasting (multicasting) to select the most suitable access point.

Next, there will be described the case where the access points AP1 to AP5 transmits pieces of fragmented information to the server 102, and the server 102 unites the pieces of fragmented information. In this method, for example, the access points identify a transmitting destination server and an uploading method, using the URL of an upload destination that has been specified at the time of the cooperation (information on the original URL in FIG. 23). Thereafter, the fragmented information is transmitted to the server together with the identifier of the fragment. Here, it is assumed that the transmitting destination server is the server 102. The identifier of the fragment, as shown in FIG. 23, contains the order information, and thus the server 102 can reconstruct a series of pieces of information in accordance with the order.

Note that the access points may share, in addition to the original URL, information to specify the uploading method (e.g., an HTTP method and a required parameter).

In the above-described methods, the uploading method may be notified to the access points in advance by means other than the object communication with the wireless terminal 101. Here, in information uploading in a data storage service, an SNS (Social Network Service) service or the like provided on the network, an exchanging method of information is specified in the form of APIs (Application Programming Interfaces). When a service to be a transmitting destination of information is identified using information on an original URL, it is possible to properly transmit the information using APIs that are published in advance. A service can be identified using information on a domain name and a path contained in a URL.

In a series of coupling processes, a representative access point or a transmitting destination server (e.g., server 102) may perform various error handling to deal with the cases where pieces of fragmented information cannot be united. For example, if original object information cannot be restored even when a certain amount of time elapses after the representative access point or the transmitting destination server starts the coupling processes, the coupling processes itself may be cancelled. If it is clear that a particular piece of fragmented information is lacking, the representative access point or the transmitting destination server may request an access point or a wireless terminal 101, in which the piece of fragmented information is stored, to retransmit the piece of fragmented information. These error states may be notified to the wireless terminal 101 (and a user of the wireless terminal 101) via a server to be an upload destination of the object information (or a server group providing the service).

In the present embodiment, as with the first embodiment, the controller 207 of the access point AP1 being a requesting source may determine the volume of fragmented information and/or an access point to be a cooperation object using the moving speed and/or the staying time periods of the wireless terminal 101. In more detail, the controller 207 of the access point AP1 being the requesting source may acquire the moving status of the wireless terminal 101, determine staying time periods for which the wireless terminal 101 stays within the wireless communication areas of the other relay devices using the acquired moving status of the wireless terminal 101, and determine the volumes of storage areas requested to be allocated and/or the other relay devices to be transmitting destinations of a request signal in accordance with the staying time periods and/or the moving speed.

In addition, if an assumed route is changed, the influence thereof is expected to be larger in uploading than downloading, and thus the upload processing may be interrupted because a storage area is not allocated in advance. Cooperating destinations may be determined in advance assuming a plurality of patterns. In that case, it is necessary to include a mechanism that cancels cooperation with a timer or the like.

Note that the series of descriptions have been made taking the case of acquiring one piece of information, the descriptions can be also applied to the case of uploading a plurality of pieces of information at once.

As described above, when a communication request is an uploading request, the request signal contains the identifier of object information to be uploaded and the size of a storage area requested to be allocated. This allows each access point being a cooperating destination to allocate a storage area having the size contained in the request signal in the temporary storage 208. Then, when receiving piece of fragmented information specified by an identifier contained in the request signal from the wireless terminal 101, each access point being the cooperating destination can save the piece of fragmented information in the allocated storage area.

Fourth Embodiment

Next, a fourth embodiment will be described. In the fourth embodiment, as with the second embodiment, upload processing with the controller 300 will be described. The configuration of a communication system 2 in the fourth embodiment is the same as the configuration of the communication system 2 in the second embodiment shown in FIG. 15, and will not be described.

In addition, the same functional block diagrams in the second embodiment, that is, the three functional block diagrams in FIG. 16, FIG. 20, and FIG. 21, can be applied to the functional block diagrams of the controller 300.

Functions that the controller 300 has relate to, as described in the second embodiment, the cooperating function among access points. The controller 407 of the controller 300 performs processing, in the third embodiment, up to issuing a cooperation instruction by an access point receiving an uploading request of information. Here, this processing is to collect the statuses of wireless networks from the access points, determine access points to cooperate with taking the collected statuses of wireless networks into consideration, and issue the cooperation instruction to the object access points.

In addition, the controller 407 of the controller 300 collects and unites pieces of fragmented information from access points that hold the pieces of fragmented information and finally transmits the united and restored original object information to the server 102.

The details of the operations in these two processes are the same as those performed by an access point in the above-described third embodiment. Therefore, the details thereof will not be described. As with the case of the second embodiment, using the controller may allow a cooperation object access point to be selected with high precision.

In addition, as described with reference to FIG. 16, FIG. 20, and FIG. 21, the controller 300 also includes the temporary storage 408. The final transmission to the server 102 may be temporarily delayed by making use of this temporary storage 408. Furthermore, if an acquisition request to object information being intended to be transmitted to the server 102 is issued from an access point that is connected in a wired manner, the object information saved in the temporary storage 408, which is waiting to be transmitted, may be transmitted to the access point.

(Operation of Terminal During Cooperation Among Access Points)

As described thus far in the embodiments (e.g., FIG. 22), the wireless terminal 101 transmits one downloading request or uploading request, and thereafter information is automatically divided for the access points to be downloaded or uploaded. Here, to transmit information to different nodes using TCP, a communicating node has to establish TCP connections with the respective nodes. That is, the descriptions thus far have not been made precisely about the operations of the wireless terminal 101 and the access point AP. A supplementary description about this point will be given below.

From the viewpoint of information exchange, establishment processing of a TCP connection is overhead. Therefore, it is desirable to shift a TCP connection to the next access point without causing a change in a destination of the TCP connection to be sensed on a terminal side. To implement this, an access point may include a live migrating function of a TCP connection.

That is, if a first access point AP detects that the wireless terminal 101 moves away from the access point while downloading/uploading information to/from the temporary storage 208 (this can be detected by monitoring a radio field intensity), the first access point may start the transmission of information on a TCP connection to a second access point that is predicted to be next connected from the wireless terminal 101. The second access point receiving the information may prepare to restart the TCP connection. This information on the TCP connection may be transmitted only once, and thereafter packets on the object TCP connection may continue to be transferred, or may be transmitted whenever a change occurs. In any case, the processing is completed when it is confirmed that the TCP connection is shifted to the second access point.

Another method is a method of disconnecting or reconnecting a TCP connection in cooperation with the wireless terminal 101. In this method, it is necessary to notify information on an access point being a cooperating destination to the wireless terminal 101 before downloading or uploading is started or during the downloading or uploading. In a normal HTTP POST method, a response cannot be transmitted until the downloading or uploading is completed, and thus it is necessary to communicate with the access point by means other than the HTTP POST method.

Here, assuming that this communication channel is referred to as a control channel, the wireless terminal 101 establishes a control channel with a cooperating source access point and transmits meta information on information to be downloaded or uploaded to the cooperating source access point. The cooperating source access point performs the above-mentioned cooperation processing based on this meta information, and transmits information on the cooperating destination access point to the wireless terminal 101 as a response. In such a manner, the wireless terminal 101 and the cooperating source access point can comprehend a plurality of cooperating destination access points in advance.

In operation, when detecting that the wireless terminal 101 moves away from an access point, the current access point transmits a packet with a FIN flag set to the wireless terminal 101 to normally terminate a TCP connection or transmits a packet with a RST flag set to the wireless terminal 101 to forcibly terminate the TCP connection. When detecting that the current TCP connection is disconnected, the wireless terminal 101 establishes a TCP connection with the next access point, which is notified in advance via the control channel, to communicate with the next access point. At this point, the identifier of the connection destination (IP address) may be changed or not changed with a physical change in the connection destination. The access point AP in the embodiments can deal with both the cases. Here, if the identifier is changed, the access point AP deals with it by notifying the change in the identifier in advance via the control channel. If the identifier is not changed, an object TCP connection is captured regardless of the destination IP address by an access point operating as a transparent proxy.

As described above, in the present embodiment, in downloading or uploading object information, a TCP connection between the wireless terminal 101 and the access point AP is properly maintained and managed.

Fifth Embodiment

Next, a fifth embodiment will be described. The fifth embodiment is an embodiment that adds a size changing function of a cache area to one of the first to fourth embodiments.

In the first to fourth embodiments having been described thus far, the size of the temporary storage to cache object information is not mentioned in particular. The capacity of an actual storage has an upper limit, and thus there is an upper limit of the amount of information to be cached. If an access point and a controller implement both a downloading side function and an uploading side function at the same time, the allocated amount of the storage to the functions has an influence on the performances of the devices and the whole system.

In addition, even if an access point has only the downloading function, when the access point provides a plurality of networks (e.g. a plurality of SSIDs), it is natural to divide and manage a cache for each network. At that point, if the temporary storage 208 is equally divided without taking the network usage in consideration, the performance is degraded in a heavily used network and an area allocated to a lightly used network becomes useless.

Thus, the present embodiment adds a function that can change the area allocations of a storage. This is enabled, for example, by adjusting a threshold value of a management software, dynamically changing logical division sizes in the storage device, changing the file size allocated to a virtual disk, or changing the number of connections with storage devices that are connected over a network. In addition, triggers to change the area allocation include the case where the number of wireless terminals using a specified network at an access point exceeds an upper limit value or falls below a lower limit value, the case where many requests that use a specified area are received (e.g., when many downloading requests are issued), the case where the amount of information saved in the temporary storage 208 exceeds (or falls below) a predetermined threshold value (upper limit value/lower limit value), and the like.

Sixth Embodiment

Next, a sixth embodiment will be described. In the sixth embodiment, a request is treated in the form of advance reservation based distribution in one of the first to fourth embodiments.

The embodiments thus far have been described that, when the wireless terminal transmits a communication request, a response is immediately obtained and the response is controlled so as to be stored in the temporary storages among a plurality of access points. In the present embodiment, there will be described the case where the wireless terminal does not immediately obtain a response, but the response is reserved until some condition is satisfied.

Figure 24:
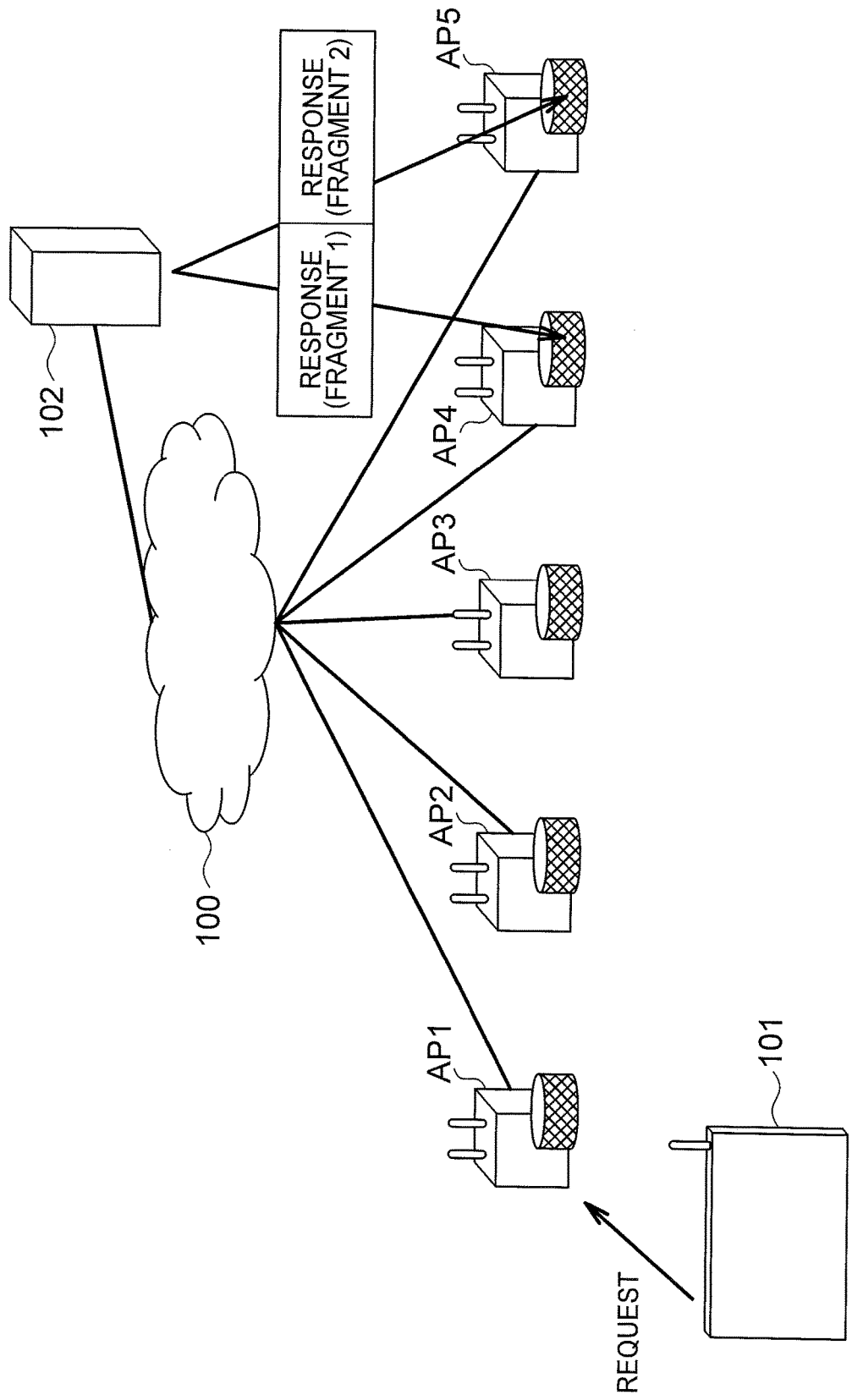
FIG. 24 is a diagram for illustrating the operation of a communication system in a sixth embodiment.

An operation image of the present embodiment will be described with reference to FIG. 24. FIG. 24 is a diagram for illustrating the operation of a communication system 1 in the sixth embodiment. Note that, the configuration of the communication system 1 in the sixth embodiment is the same as the configuration of the communication system 1 in the first embodiment, and will not be described. In this drawing, the wireless terminal 101 transmits a request when communicating with the access point AP1 that is first connected, but the access point AP1 does not receive the request. Instead, a response is divided into two pieces of fragmented information (a response (fragment 1) and a response (fragment 2) in FIG. 24), and the pieces of fragmented information are precedently distributed to two access points AP4 and AP5, respectively, that is on a moving route.

This division processing is the same as in the above-described first embodiment, or the same as in the second embodiment if there is a controller, although there is no controller in this drawing. In addition, method of selecting an access point to be advance distributing destinations of responses includes one in which the wireless terminal 101 specifies all, one in which the wireless terminal 101 specifies only a starting point and the access point AP specifies the remaining destinations, and one in which the access point AP determines all.

In the case where the wireless terminal 101 specifies the destinations, information on receiving access points may be specified in addition to request transmission or as an individual message before and after the request transmission. In the case where using HTTP GET as a request message, a conceivable method is to add unique information to an HTTP header. Information necessary for the wireless terminal 101 to detect access points to which responses are transmitted (e.g., MAC addresses of the access points) is informed in advance to the terminal by means such as a response of the request. The wireless terminal 101 may detect that it enters the communication area of the receiving access point and transmit a request to the access point (or the server 102 again if it is implemented as a transparent proxy).

In addition, the above-described various processes relating to the access point AP or the controller 300 in the embodiments may be performed by recording a program to perform the processes of the access point AP or the controller 300 in the embodiments in a computer readable recording medium, causing a computer system to read the program recorded in the recording medium, and causing a processor to execute the program.

The terms used in each embodiment should be interpreted broadly. For example, the term "processor" may encompass a general purpose processor, a central processor (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "temporary storage" or "memory" may encompass any electronic component which can store electronic information. The "memory" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic or optical data storage, which are readable by a processor. It can be said that the memory electronically communicates with a processor if the processor read and/or write information for the memory. The memory may be integrated to a processor and also in this case, it can be said that the memory electronically communication with the processor.

The term "storage" may generally encompass any device which can memorize data permanently by utilizing magnetic technology, optical technology or non-volatile memory such as an HDD, an optical disc or SSD.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A relay device for relaying a signal between a first network and a second network, the relay device comprising:
   first circuitry configured to wirelessly communicate with a wireless terminal over the first network and communicate with a first relay device over the second network;
   second circuitry configured to detect a communication request transmitted by the wireless terminal; and
   third circuitry configured to determine whether or not relay of object information corresponding to the communication request is able to be completed with the wireless terminal while the wireless terminal stays within a wireless communication range of the relay device, and cause the first circuitry to transmit a request signal to request to relay a part or a whole of the object information to the first relay device instead of said relay device when the determining determines that the relay is not able to be completed,
   wherein, in a case in which the communication request is a downloading request, the third circuitry is configured to, if the object information that is requested using the communication request is saved in an accessible storage device, cause the first circuitry to transmit a part of the saved object information to the wireless terminal, and cause the first circuitry to transmit a request signal to request to allocate a storage area in which a part or the whole of the object information is stored to the first relay device, and
   the third circuitry is configured to, when the object information is not saved in the storage device, acquire the object information from an information processing device connected over the second network, cause the first circuitry to transmit a part of the acquired object information to the wireless terminal, and cause the first circuitry to transmit a request signal to request to allocate a storage area in which a part or the whole of the acquired object information is stored to the first relay device.

2. The relay device according to claim 1, wherein
   the first network is a wireless network, and
   the second network is a wired network.

3. A relay for relaying a signal between a first network and a second network, the relay device comprising:
   first circuitry configured to wirelessly communicate with a wireless terminal over the first network and communicate with a first relay device over the second network;
   second circuitry configured to detect a communication request transmitted by the wireless terminal; and
   third circuitry configured to determine whether or not relay of object information corresponding to the communication request is able to be completed with the wireless terminal while the wireless terminal stays within a wireless communication range of the relay device, and cause the first circuitry to transmit a request signal to request to relay a part or a whole of the object information to the first relay device instead of said relay device when the determining determines that the relay is not able to be completed;
   fourth circuitry configured to monitor a status of a communication channel and/or communication in the first network and acquire communication status information representing the status of the communication channel and/or communication, wherein
   the third circuitry is configured to make the determination based on the communication status information.

4. The relay device according to claim 3, wherein in a case in which the communication request is a downloading request, the third circuitry is configured to cause, after the request signal is transmitted, the first circuitry to transmit shared information being a part or the whole of the object information to the first relay device.

5. The relay device according to claim 4, wherein
   the fourth circuitry is configured to acquire the communication status information as first communication status information, and
   the third circuitry is configured to acquire second communication status information representing a status of a communication channel and/or communication of the first relay device from the first relay device, and determine an amount of the shared information in accordance with at least one of the first communication status information and the second communication status information.

6. The relay device according to claim 4, wherein
   the first relay device is plural in number,
   the fourth circuitry is configured to acquire the communication status information as first communication status information, and
   the third circuitry is configured to acquire second communication status information representing a status of a communication channel and/or communication of the first relay device from the first relay device, and determine a transmitting destination of the shared information from among the plurality of first relay devices in accordance with at least one of the first communication status information and the second communication status information.

7. The relay device according to claim 4, wherein the third circuitry is configured to acquire a moving status of the wireless terminal, determine a staying time period for which the wireless terminal stays within a wireless communication area of the first relay device using the acquired moving status of the wireless terminal, and determine the amount and/or a transmitting destination of the shared information in accordance with the staying time period.

8. The relay device according to claim 7, wherein the third circuitry is configured to determine the amount and/or the transmitting destination of the shared information in accordance with the staying time period as well as a transmission speed of the first relay device.

9. The relay device according to claim 7, wherein the third circuitry is configured to determine a staying time period for which the wireless terminal stays within a wireless communication area of the relay device using communication status information that is obtained by the fourth circuitry through monitoring, and determine a separating position used to extract the shared information from the object information using the determined staying time period.

10. The relay device according to claim 4, wherein
    the data is content,
    the first relay device is plural in number, and the third circuitry is configured to acquire a moving status of the wireless terminal, determine an amount of data to be transmitted to the wireless terminal within a wireless communication area of the relay device using the moving status of the wireless terminal and the wireless communication range of the relay device, and determine a transmitting destination of the shared information from among the plurality of first relay devices using a playback time period taken to play back the content having the determined amount of data and a moving status of the wireless terminal.

11. The relay device according to claim 4, wherein the third circuitry is configured to acquire meta information on a part of information that is held by the first relay device out of the shared information, and cause the first circuitry to transmit information that is not held by the first relay device out of the shared information to the first relay device using the meta information.

12. A relay device for relaying a signal between a first network and a second network, the relay device comprising:
first circuitry configured to wirelessly communicate with a wireless terminal over the first network and communicate with a first relay device over the second network;
second circuitry configured to detect a communication request transmitted by the wireless terminal; and
third circuitry configured to determine whether or not relay of object information corresponding to the communication request is able to be completed with the wireless terminal while the wireless terminal stays within a wireless communication range of the relay device, and cause the first circuitry to transmit a request signal to request to relay a part or a whole of the object information to the first relay device instead of said relay device when the determining determines that the relay is not able to be completed,
wherein in a case in which the communication request is an uploading request, the request signal contains an identifier of object information to be uploaded and a size of a storage area that is requested to be allocated.

13. The relay device according to claim 12, further comprising
fourth circuitry configured to monitor a status of communication channel and/or communication in the first network and acquire first communication status information representing the status of the communication channel and/or communication, wherein
the third circuitry is configured to acquire second communication status information representing a status of a communication channel and/or communication of the first relay device from the first relay device, and determine a volume of the storage area that is requested to be allocated in accordance with at least one of the first communication status information obtained by the fourth circuitry through monitoring and the second communication status information.

14. The relay device according to claim 12, wherein
the first relay device is plural in number, and the relay device further comprises:
fourth circuitry configured to monitor a status of communication channel and/or communication in the first network and acquire first communication status information representing the status of the communication channel and/or communication, wherein
the third circuitry is configured to acquire second communication status information representing statuses of communication channels and/or communication of the first relay devices from the first relay devices, and determine one of the first relay devices to be a transmitting destination of the request signal in accordance with at least one of the first communication status information obtained by the fourth circuitry through monitoring and the second communication status information.

15. The relay device according to claim 12, wherein the third circuitry is configured to acquire a moving status of the wireless terminal, determine a staying time period for which the wireless terminal stays within a wireless communication area of the first relay device using the acquired moving status of the wireless terminal, and determine a volume of the storage area that is requested to be allocated and/or the first relay device to be a transmitting destination of the request signal in accordance with the staying time period.

* * * * *